United States Patent
Guo

(10) Patent No.: US 12,413,412 B2
(45) Date of Patent: Sep. 9, 2025

(54) COMMUNICATION METHOD AND COMMUNICATIONS APPARATUS FOR AUTHENTICATION IN A HANDSHAKE PROCESS

(71) Applicant: Shenzhen Yinwang Intelligent Technologies Co., Ltd., Shenzhen (CN)

(72) Inventor: Zhipeng Guo, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 200 days.

(21) Appl. No.: 17/987,694

(22) Filed: Nov. 15, 2022

(65) Prior Publication Data

US 2023/0080139 A1 Mar. 16, 2023

Related U.S. Application Data

(63) Continuation of application No. PCT/CN2020/090460, filed on May 15, 2020.

(51) Int. Cl.
*H04L 9/32* (2006.01)

(52) U.S. Cl.
CPC .......... *H04L 9/3236* (2013.01); *H04L 9/3228* (2013.01); *H04L 9/3247* (2013.01); *H04L 9/3263* (2013.01)

(58) Field of Classification Search
CPC ... H04L 9/3236; H04L 9/3228; H04L 9/3247; H04L 9/3263
See application file for complete search history.

(56) References Cited

U.S. PATENT DOCUMENTS

| | | | |
|---|---|---|---|
| 8,943,327 B2 * | 1/2015 | Martin | G06F 21/73 |
| | | | 713/189 |
| 9,935,769 B1 * | 4/2018 | Mehr | H04L 63/0272 |
| | (Continued) | | |

FOREIGN PATENT DOCUMENTS

| CN | 103763356 A | 4/2014 |
|---|---|---|
| CN | 106453269 A | 2/2017 |
| | (Continued) | |

OTHER PUBLICATIONS

Noh, Jaewon, et al. "Secure key exchange scheme for WPA/WPA2-PSK using public key cryptography." 2016 IEEE International Conference on Consumer Electronics-Asia (ICCE-Asia). IEEE, 2016.*

(Continued)

*Primary Examiner* — Jimmy H Tran

(74) *Attorney, Agent, or Firm* — Leydig, Voit & Mayer, Ltd.

(57) ABSTRACT

A communication method and related device for improving handshake efficiency and transmission reliability are provided. The method includes: a second device receives authentication request information from a first device, wherein the authentication request information includes identifier information of the first device. The second device determines, based on a first mapping relationship, a cryptographic algorithm suite corresponding to the identifier information of the first device, wherein the first mapping relationship indicates a correspondence between identifier information of at least one device and at least one cryptographic algorithm suite. The second device generates authentication response information based on the cryptographic algorithm suite. The second device sends the authentication response information to the first device.

20 Claims, 11 Drawing Sheets

(56) References Cited

U.S. PATENT DOCUMENTS

| | | | |
|---|---|---|---|
| 10,271,253 B2* | 4/2019 | Wang | H04L 63/20 |
| 10,630,466 B1* | 4/2020 | Wilbur | H04L 9/0861 |
| 2010/0031042 A1* | 2/2010 | Di Crescenzo | H04L 9/32 |
| | | | 713/168 |
| 2012/0100833 A1* | 4/2012 | Gao | H04W 12/069 |
| | | | 455/411 |
| 2013/0195274 A1 | 8/2013 | Nakashima et al. | |
| 2014/0149740 A1* | 5/2014 | Sato | H04L 9/006 |
| | | | 713/158 |
| 2015/0288514 A1* | 10/2015 | Pahl | H04L 63/166 |
| | | | 713/171 |
| 2015/0381362 A1* | 12/2015 | Thota | H04L 63/123 |
| | | | 713/189 |
| 2016/0013935 A1* | 1/2016 | Pahl | H04L 9/321 |
| | | | 713/171 |
| 2016/0014114 A1* | 1/2016 | Pahl | H04L 9/0844 |
| | | | 713/156 |
| 2016/0164678 A1* | 6/2016 | Nix | H04L 9/006 |
| | | | 380/270 |
| 2016/0226827 A1* | 8/2016 | Bohannon | H04L 63/0823 |
| 2016/0241389 A1* | 8/2016 | Le Saint | H04L 9/14 |
| 2017/0041141 A1* | 2/2017 | Anthony | G06F 21/34 |
| 2018/0262530 A1* | 9/2018 | Sharifi Mehr | H04L 63/0428 |
| 2019/0245681 A1* | 8/2019 | Alwen | H04L 9/085 |
| 2019/0273728 A1* | 9/2019 | Sharifi Mehr | H04L 63/205 |
| 2020/0280436 A1* | 9/2020 | Nix | H04L 9/0869 |
| 2021/0058240 A1* | 2/2021 | Alwen | H04L 9/0861 |
| 2021/0218560 A1* | 7/2021 | Nix | H04L 9/3252 |
| 2022/0069995 A1* | 3/2022 | Philipp | H04L 9/30 |
| 2022/0131709 A1* | 4/2022 | Nix | H04L 9/3252 |
| 2022/0248221 A1* | 8/2022 | Nix | H04W 12/02 |
| 2022/0264300 A1* | 8/2022 | Nix | H04L 9/3265 |
| 2023/0370258 A1* | 11/2023 | Armleder | H04L 9/3228 |
| 2024/0146767 A1* | 5/2024 | Griffin | H04L 63/08 |

FOREIGN PATENT DOCUMENTS

| | | |
|---|---|---|
| CN | 107612899 A | 1/2018 |
| CN | 108809633 A | 11/2018 |
| CN | 110881048 A | 3/2020 |
| EP | 2207302 A1 | 7/2010 |
| EP | 2356772 B1 | 4/2020 |
| JP | 2005198211 A | 7/2005 |
| KR | 20130089663 A | 8/2013 |
| WO | 2010049673 A1 | 5/2010 |

OTHER PUBLICATIONS

Housley, R. "RFC 8696 Using Pre-Shared Key (PSK) in the Cryptographic Message Syntax (CMS)." (2019).*

Kuppannan et al., "TLS/DTLS PSK Identity Extension draft-jay-tls-psk-identity-extension-02," TLS Working Group Internet-Draft, XP015117076, Total 10 pages (Dec. 15, 2016).

Postel "User Datagram Protocol," Request for Comments: 768, pp. 1-3 (Aug. 28, 1980).

Dierks et al., "The Transport Layer Security (TLS) Protocol Version 1.2," Network Working Group, Request for Comments: 5246, XP055469140, pp. 1-104 (Aug. 2008).

"Transmission Control Protocol; Darpa Internet Program; Protocol Specification," Request for Comments: 793, Total 91 pages (Sep. 1981).

Rescorla "The Transport Layer Security (TLS) Protocol Version 1.3," Internet Engineering Task Force (IETF), Request for Comments: 8446, XP055863908, pp. 1-160 (Aug. 2018).

Turner et al., "Prohibiting Secure Sockets Layer (SSL) Version 2.0," Internet Engineering Task Force (IETF), Request for Comments: 6176, pp. 1-4 (Mar. 2011).

Modadugu et al., "The Design and Implementation of Datagram TLS," XP002390018, Total 13 pages (Feb. 6, 2004).

Rescorla et al., "The Datagram Transport Layer Security (DTLS) Protocol Version 1.3 draft-ietf-tls-dtls 13-37," TLS Internet-Draft, XP015138452, pp. 1-53 (Mar. 9, 2020).

* cited by examiner

COMMUNICATION METHOD AND COMMUNICATIONS APPARATUS FOR
AUTHENTICATION IN A HANDSHAKE
PROCESS

CROSS-REFERENCE TO RELATED APPLICATIONS

This application is a continuation of International Application No. PCT/CN2020/090460, filed on May 15, 2020, the disclosure of which is hereby incorporated by reference in its entirety.

TECHNICAL FIELD

Embodiments of this application relate to the communications field, and more specifically, to a communication method and a communications apparatus.

BACKGROUND

Currently, the automotive open system architecture (AUTOSAR) consortium defines a transport layer security (TLS) protocol and a datagram transport layer security (DLTS) protocol for secure communication of automotive Ethernet (Eth).

In an initial handshake process or a pre-shared key-based handshake process of two devices, one device needs to transfer a list of cryptographic algorithm suites supported by the device to the other device, regardless of whether it is based on the TLS protocol or the DTLS protocol. However, a data volume of the list of the cryptographic algorithm suites is relatively large. As a result, it is easy to cause fragmented transmission of internet protocol (IP) packets in the handshake process, and transmission reliability and communication efficiency are affected.

SUMMARY

This application provides a communication method, to improve transmission reliability and communication efficiency in a handshake process of devices.

According to a first aspect, a communication method is provided. The method includes: A second device receives authentication request information from a first device, where the authentication request information includes identifier information of the first device. The second device determines, based on a first mapping relationship, a cryptographic algorithm suite corresponding to the identifier information of the first device, where the first mapping relationship is used to indicate a correspondence between identifier information of at least one device and at least one cryptographic algorithm suite. The second device generates authentication response information based on the cryptographic algorithm suite. The second device sends the authentication response information to the first device.

According to the foregoing technical solution, the cryptographic algorithm suite corresponds to the identifier information of the device, so that the second device can determine, based on the stored first mapping relationship, the cryptographic algorithm suite used in a process of communicating with the first device. There is no need to transfer a list of supported cryptographic algorithm suites in a handshake process between the first device and the second device. This reduces a volume of data transmitted in the handshake process, and improves transmission reliability and communication efficiency.

With reference to the first aspect, in some implementations of the first aspect, before the second device sends the authentication response information to the first device, the method further includes: The second device determines that a pre-configured second list includes the identifier information of the first device, where the second list includes identifier information of a device that needs to be authenticated.

According to the foregoing technical solution, the second list is pre-configured in the second device, so that the second device can determine source validity of the first device when determining that the identifier information of the first device is stored in the second list, that is, the solution with the second list can replace a cookie field allocation solution in an original handshake process. A malicious device can be prevented from forging a false source to initiate an authentication process, and the second device can directly ignore an authentication request from the invalid device based on the second list. This can reduce a processing burden of the second device, and increase an attack difficulty of an attacker.

With reference to the first aspect, in some implementations of the first aspect, the authentication request information further includes a first device certificate of the first device and/or a first signature value used by the first device; and/or the authentication response information further includes a second device certificate of the second device and/or a second signature value used by the second device.

With reference to the first aspect, in some implementations of the first aspect, the authentication request information further includes a first random number used by the first device and/or a first temporary public key used by the first device; and the authentication response information further includes a second random number used by the second device and/or a second temporary public key used by the second device.

With reference to the first aspect, in some implementations of the first aspect, the authentication request information further includes a first cipher, and/or the authentication response information further includes a second cipher, and the second cipher is generated by the second device based on a pre-stored pre-shared key and the cryptographic algorithm suite.

According to the foregoing solution, the first device and the second device can generate the cipher to replace the device certificate based on the determined cryptographic algorithm suite and the pre-stored pre-shared key. A length of the cipher is much shorter than a length of the device certificate. This greatly reduces a volume of data exchanged in the handshake interaction process, and improves handshake efficiency and reliability.

In addition, after the cipher is used to replace the device certificate, the device does not need to perform signature verification on a root signature in the device certificate. Instead, the device performs a symmetric encryption and decryption operation on the cipher. A speed of the symmetric encryption and decryption operation is much higher than a speed of signature verification, and this can improve handshake efficiency.

With reference to the first aspect, in some implementations of the first aspect, the authentication request information further includes a first temporary public key used by the first device; and the authentication response information further includes a second temporary public key used by the second device and identifier information of the second device.

With reference to the first aspect, in some implementations of the first aspect, each of the at least one cryptographic algorithm suite meets a forward security requirement.

With reference to the first aspect, in some implementations of the first aspect, the method further includes: The second device determines a packet encryption mode used for communication with the first device, where the packet encryption mode includes one of a full encryption mode and an on-demand encryption mode.

According to the foregoing technical solution, the on-demand encryption mode of a communication packet is defined, so that data that does not need to be encrypted can be transmitted in plaintext in the on-demand encryption mode. This reduces a data volume of an encryption payload, improves an encryption rate, and improves communication efficiency.

With reference to the first aspect, in some implementations of the first aspect, that the second device determines the packet encryption mode used for communication with the first device includes: The second device determines, based on a second mapping relationship, the packet encryption mode corresponding to the identifier information of the first device, where the second mapping relationship is used to indicate a correspondence between identifier information of at least one device and at least one packet encryption mode.

With reference to the first aspect, in some implementations of the first aspect, when the packet encryption mode is the on-demand encryption mode, the method further includes: The second device generates a communication packet, where the communication packet includes the following fields: a plaintext identifier, plaintext data, a ciphertext identifier, and ciphertext data.

With reference to the first aspect, in some implementations of the first aspect, the plaintext data includes a stream encryption key generation seed of the ciphertext data.

In a handshake process of a current user datagram protocol, a stream encryption algorithm cannot be used. According to the foregoing technical solution, in the on-demand encryption mode, the stream encryption key generation seed of the ciphertext data can be stored in the plaintext data, so that a user datagram protocol can support a stream encryption algorithm.

According to a second aspect, a communication method is provided. The method includes: A first device determines, based on a third mapping relationship, a cryptographic algorithm suite corresponding to identifier information of a second device, where the third mapping relationship is used to indicate a correspondence between identifier information of at least one device and at least one cryptographic algorithm suite. The first device generates authentication request information based on the cryptographic algorithm suite, where the authentication request information includes identifier information of the first device. The first device sends the authentication request information to the second device. The first device receives authentication response information from the second device.

According to the foregoing technical solution, the cryptographic algorithm suite corresponds to the identifier information of the device, so that the first device can determine, based on the stored third mapping relationship, the cryptographic algorithm suite used in a process of communicating with the second device. There is no need to transfer a list of supported cryptographic algorithm suites in a handshake process between the first device and the second device. This reduces a volume of data transmitted in the handshake process, and improves transmission reliability and communication efficiency.

With reference to the second aspect, in some implementations of the second aspect, before the first device sends the authentication request information to the second device, the method further includes: The first device determines that a pre-configured first list includes the identifier information of the second device, where the first list includes identifier information of a device that needs to be authenticated.

According to the foregoing technical solution, the first list is pre-configured in the first device, so that the first device can determine source validity of the second device when determining that the identifier information of the second device is stored in the second list.

With reference to the second aspect, in some implementations of the second aspect, the authentication request information further includes a device certificate of the first device and/or a first signature value used by the first device; and/or the authentication response information further includes a second device certificate of the second device and/or a second signature value used by the second device.

With reference to the second aspect, in some implementations of the second aspect, the authentication request information further includes a first cipher, and the first cipher is generated by the first device based on a pre-stored pre-shared key and the cryptographic algorithm suite; and/or the authentication response information further includes a second cipher.

According to the foregoing solution, the first device and the second device can generate the cipher to replace the device certificate based on the determined cryptographic algorithm suite and the pre-stored pre-shared key. A length of the cipher is much shorter than a length of the device certificate. This greatly reduces a volume of data exchanged in the handshake interaction process, and improves handshake efficiency and reliability.

In addition, after the cipher is used to replace the device certificate, the device does not need to perform signature verification on a root signature in the device certificate. Instead, the device performs a symmetric encryption and decryption operation on the cipher. A speed of the symmetric encryption and decryption operation is much higher than a speed of signature verification, and this can improve handshake efficiency.

With reference to the second aspect, in some implementations of the second aspect, the authentication request information further includes a first temporary public key used by the first device; and the authentication response information further includes a second temporary public key used by the second device and the identifier information of the second device.

With reference to the second aspect, in some implementations of the second aspect, the authentication request information further includes a first random number used by the first device and/or a first temporary public key used by the first device; and the authentication response information further includes a second random number used by the second device and/or a second temporary public key used by the second device.

With reference to the second aspect, in some implementations of the second aspect, each of the at least one cryptographic algorithm suite meets a forward security requirement.

With reference to the second aspect, in some implementations of the second aspect, the method further includes: The first device determines a packet encryption mode used for communication with the second device, where the packet encryption mode includes one of a full encryption mode and an on-demand encryption mode.

According to the foregoing technical solution, the on-demand encryption mode of a communication packet is defined, so that data that does not need to be encrypted can be transmitted in plaintext in the on-demand encryption mode. This reduces a data volume of an encryption payload, improves an encryption rate, and improves communication efficiency.

With reference to the second aspect, in some implementations of the second aspect, that the first device determines the packet encryption mode used for communication with the second device includes: The first device determines, based on a fourth mapping relationship, the packet encryption mode corresponding to the identifier information of the second device, where the fourth mapping relationship is used to indicate a correspondence between identifier information of at least one device and at least one packet encryption mode.

With reference to the second aspect, in some implementations of the second aspect, when the packet encryption mode is the on-demand encryption mode, the method further includes: The first device generates a communication packet, where the communication packet includes the following fields: a plaintext identifier, plaintext data, a ciphertext identifier, and ciphertext data.

With reference to the second aspect, in some implementations of the second aspect, the plaintext data includes a stream encryption key generation seed of the ciphertext data.

In a handshake process of a current user datagram protocol, a stream encryption algorithm cannot be used. According to the foregoing technical solution, in the on-demand encryption mode, the stream encryption key generation seed of the ciphertext data can be stored in the plaintext data, so that a user datagram protocol can support a stream encryption algorithm.

According to a third aspect, a communications apparatus is provided. The communications apparatus includes a transceiver unit and a processing unit. The transceiver unit is configured to receive authentication request information from a first device, where the authentication request information includes identifier information of the first device. The processing unit is configured to determine, based on a first mapping relationship, a cryptographic algorithm suite corresponding to the identifier information of the first device, where the first mapping relationship is used to indicate a correspondence between identifier information of at least one device and the at least one cryptographic algorithm suite. The processing unit is further configured to generate authentication response information based on the cryptographic algorithm suite. The transceiver unit is further configured to send the authentication response information to the first device.

With reference to the third aspect, in some implementations of the third aspect, the processing unit is further configured to determine that a pre-configured second list includes the identifier information of the first device, where the second list includes identifier information of a device that needs to be authenticated.

With reference to the third aspect, in some implementations of the third aspect, the authentication request information further includes a first device certificate of the first device and/or a first signature value used by the first device; and/or the authentication response information further includes a second device certificate of the communications apparatus and/or a second signature value used by the communications apparatus.

With reference to the third aspect, in some implementations of the third aspect, the authentication request information further includes a first cipher; and/or the authentication response information further includes a second cipher, where the second cipher is generated by the processing unit based on a pre-stored pre-shared key and the cryptographic algorithm suite.

With reference to the third aspect, in some implementations of the third aspect, the authentication request information further includes a first random number used by the first device and/or a first temporary public key used by the first device; and the authentication response information further includes a second random number used by the communications apparatus and/or a second temporary public key used by the communications apparatus.

With reference to the third aspect, in some implementations of the third aspect, the authentication request information further includes a first temporary public key used by the first device; and the authentication response information further includes a second temporary public key used by the communications apparatus and identifier information of the communications apparatus.

With reference to the third aspect, in some implementations of the third aspect, each of the at least one cryptographic algorithm suite meets a forward security requirement.

With reference to the third aspect, in some implementations of the third aspect, the processing unit is further configured to determine a packet encryption mode used for communication with the first device, where the packet encryption mode includes one of a full encryption mode and an on-demand encryption mode.

With reference to the third aspect, in some implementations of the third aspect, the processing unit is specifically configured to determine, based on a second mapping relationship, the packet encryption mode corresponding to the identifier information of the first device, where the second mapping relationship is used to indicate a correspondence between identifier information of at least one device and at least one packet encryption mode.

With reference to the third aspect, in some implementations of the third aspect, when the packet encryption mode is the on-demand encryption mode, the processing unit is further configured to generate a communication packet, where the communication packet includes the following fields: a plaintext identifier, plaintext data, a ciphertext identifier, and ciphertext data.

With reference to the third aspect, in some implementations of the third aspect, the plaintext data includes a stream encryption key generation seed of the ciphertext data.

According to a fourth aspect, a communications apparatus is provided. The communications apparatus includes a transceiver unit and a processing unit. The processing unit is configured to determine, based on a third mapping relationship, a cryptographic algorithm suite corresponding to identifier information of a second device, where the third mapping relationship is used to indicate a correspondence between identifier information of at least one device and at least one cryptographic algorithm suite. The processing unit is further configured to generate authentication request information based on the cryptographic algorithm suite, where the authentication request information includes identifier information of the communications apparatus. The transceiver unit is configured to send the authentication request information to the second device. The transceiver unit is further configured to receive authentication response information from the second device.

With reference to the fourth aspect, in some implementations of the fourth aspect, the processing unit is further configured to determine that a pre-configured first list includes the identifier information of the second device, where the first list includes identifier information of a device that needs to be authenticated.

With reference to the fourth aspect, in some implementations of the fourth aspect, the authentication request information further includes a device certificate of the communications apparatus and/or a first signature value used by the communications apparatus; and/or the authentication response information further includes a second device certificate of the second device and/or a second signature value used by the second device.

With reference to the fourth aspect, in some implementations of the fourth aspect, the authentication request information further includes a first cipher, where the first cipher is generated by the communications apparatus based on a pre-stored pre-shared key and the cryptographic algorithm suite; and/or the authentication response information further includes a second cipher.

With reference to the fourth aspect, in some implementations of the fourth aspect, the authentication request information further includes a first random number used by the communications apparatus and/or a first temporary public key used by the communications apparatus; and the authentication response information further includes a second random number used by the second device and/or a second temporary public key used by the second device.

With reference to the fourth aspect, in some implementations of the fourth aspect, the authentication request information further includes a first temporary public key used by the communications apparatus; and the authentication response information further includes a second temporary public key used by the second device and the identifier information of the second device.

With reference to the fourth aspect, in some implementations of the fourth aspect, each of the at least one cryptographic algorithm suite meets a forward security requirement.

With reference to the fourth aspect, in some implementations of the fourth aspect, the processing unit is further configured to determine a packet encryption mode used for communication with the second device, where the packet encryption mode includes one of a full encryption mode and an on-demand encryption mode.

With reference to the fourth aspect, in some implementations of the fourth aspect, the processing unit is specifically configured to determine, based on a fourth mapping relationship, the packet encryption mode corresponding to the identifier information of the second device, where the fourth mapping relationship is used to indicate a correspondence between identifier information of at least one device and at least one packet encryption mode.

With reference to the fourth aspect, in some implementations of the fourth aspect, when the packet encryption mode is the on-demand encryption mode, the processing unit is further configured to generate a communication packet, where the communication packet includes the following fields: a plaintext identifier, plaintext data, a ciphertext identifier, and ciphertext data.

With reference to the fourth aspect, in some implementations of the fourth aspect, the plaintext data includes a stream encryption key generation seed of the ciphertext data.

According to a fifth aspect, a communications apparatus is provided and includes a processor. The processor is coupled to a memory, and may be configured to execute instructions in the memory, to implement the method in any one of the first aspect and the second aspect or the possible implementations of the first aspect and the second aspect.

According to a sixth aspect, a processor is provided and includes an input circuit, an output circuit, and a processing circuit. The processing circuit is used to: receive a signal through the input circuit, and transmit a signal through the output circuit, so that the processor performs the method in any one of the first aspect and the second aspect or the possible implementations of the first aspect and the second aspect.

In a specific implementation process, the foregoing processor may be a chip, the input circuit may be an input pin, the output circuit may be an output pin, and the processing circuit may be a transistor, a gate circuit, a trigger, various logic circuits, or the like. An input signal received through the input circuit may be received and input by, for example, but not limited to, a receiver, a signal output through the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to a seventh aspect, a processing apparatus is provided, includes a processor, and may further include a memory. The memory is configured to store instructions. The processor is configured to read the instructions stored in the memory, receive a signal by using a receiver, and transmit a signal by using a transmitter, to perform the method in any one of the first aspect and the second aspect or the possible implementations of the first aspect and the second aspect.

Optionally, there is one or more processors, and there is one or more memories.

Optionally, the memory may be integrated with the processor, or the memory and the processor are disposed separately.

In a specific implementation process, the memory may be a non-transitory memory, for example, a read-only memory (ROM). The memory and the processor may be integrated on a same chip, or may be separately disposed on different chips. A type of the memory and a manner of setting the memory and the processor are not limited in this embodiment of this application.

It should be understood that in a related data exchange process, for example, sending indication information, may be a process of outputting indication information from the processor, and receiving capability information may be a process of receiving input capability information by the processor. Specifically, data output after processing may be output to a transmitter, and the input data received by the processor may come from a receiver. The transmitter and the receiver may be collectively referred to as a transceiver.

The processing apparatus in the seventh aspect may be a chip. The processor may be implemented by using hardware or software. When the processor is implemented by using hardware, the processor may be a logic circuit, an integrated circuit, or the like. When the processor is implemented by using software, the processor may be a general purpose processor, and is implemented by reading software code stored in a memory. The memory may be integrated into the processor, or may be located outside the processor and exist independently.

According to an eighth aspect, a computer program product is provided. The computer program product includes a computer program (which may also be referred to as code or instructions). When the computer program is run, a computer is enabled to perform the method in any one of the first aspect and the second aspect or the possible implementations of the first aspect and the second aspect.

According to a ninth aspect, a computer-readable storage medium is provided. The computer-readable storage medium stores a computer program (which may also be referred to as code or instructions). When the computer-readable storage medium is run on a computer, the computer is enabled to perform the method in any one of the first aspect and the second aspect or the possible implementations of the first aspect and the second aspect.

According to a tenth aspect, a communications system is provided and includes the communications apparatus in any one of the third aspect or the possible implementations of the third aspect, and/or the communications apparatus in any one of the fourth aspect or the possible implementations of the fourth aspect.

DESCRIPTION OF EMBODIMENTS

The following describes the technical solutions of this application with reference to accompanying drawings.

Currently, the AUTOSAR consortium defines a TLS protocol and a DLTS protocol for secure communication of automotive Ethernet. The TLS protocol and the DTLS protocol defined in the AUTOSAR are the same as a TLS protocol and a DTLS protocol defined in a conventional Ethernet protocol. That is, the TLS protocol and the DTLS protocol defined in the AUTOSAR are the TLS protocol and the DTLS protocol that are transplanted to the automotive Ethernet.

Figure 1:
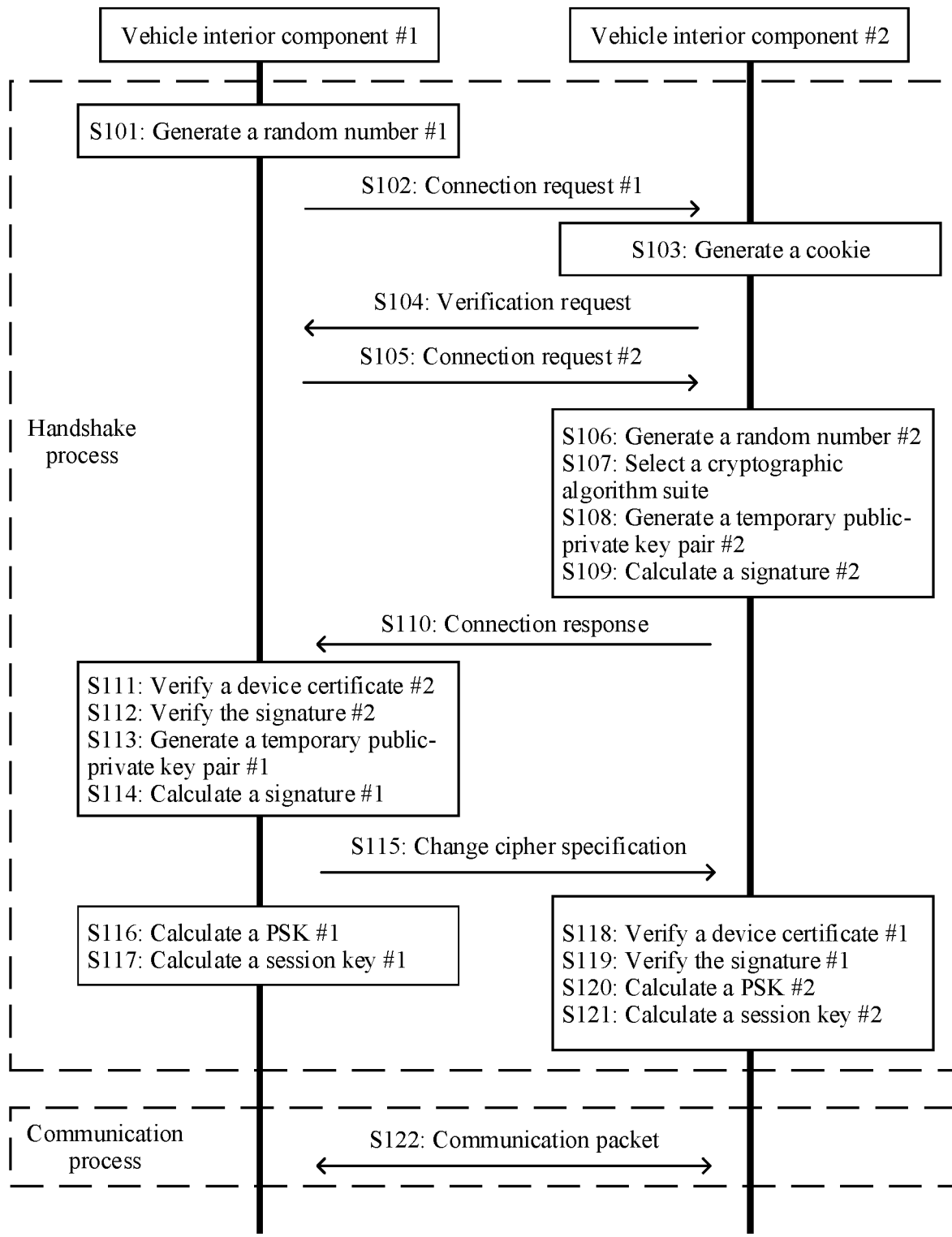
FIG. 1 is a schematic flowchart of a TLS protocol.

FIG. 1 is a flowchart of a TLS protocol. As shown in FIG. 1, the TLS protocol includes a handshake process and a communication process. A root certificate, a private key (secret key, SK) #1, and a device certificate #1 are preset in a vehicle interior component #1. The device certificate #1 includes an identity (ID) #1 of the vehicle interior component #1, a public key (PK) #1, and a root signature. A root certificate, an SK #2, and a device certificate #2 are preset in a vehicle interior component #2. The device certificate #2 includes an ID #2 of the vehicle interior component #2, a PK #2, and a root signature.

The handshake process may include, for example, the following steps.

S101: The vehicle interior component #1 generates a random number #1.

S102: The vehicle interior component #1 sends a connection request (ClientHello) #1 to the vehicle interior component #2, where the connection request #1 includes the random number #1 and a list of cryptographic algorithm suites supported by the vehicle interior component #1.

S103: The vehicle interior component #2 generates a cookie field.

S104: The vehicle interior component #2 sends a verification request (HelloVerifyRequest) to the vehicle interior component #1, where the verification request includes the cookie field.

S105: The vehicle interior component #1 sends a connection request #2 to the vehicle interior component #2, where the connection request #2 includes the random number #1, the list of cryptographic algorithm suites supported by the vehicle interior component #1, and the cookie field.

S106: The vehicle interior component #2 generates a random number #2.

S107: The vehicle interior component #2 selects a supported cryptographic algorithm suite based on the list of cryptographic algorithm suites supported by the vehicle interior component #1.

S108: The vehicle interior component #2 generates a temporary public-private key pair #2 based on the selected cryptographic algorithm suite, where the temporary public-private key pair #2 includes a temporary private key (temporary secret key, tempSK) #2 and a temporary public key (tempPK) #2.

S109: The vehicle interior component #2 calculates a signature (Sign) #2, where Sign #2=Sign(ID #2||random #2||tempPK #2).

S110: The vehicle interior component #2 sends a connection response (ServerHello) to the vehicle interior component #1, where the connection response includes the device certificate #2, the random number #2, the tempPK #2, and the Sign #2.

S111: The vehicle interior component #1 verifies validity of the device certificate #2.

S112: The vehicle interior component #1 verifies validity of the Sign #2.

S113: The vehicle interior component #1 generates a temporary public-private key pair #1, where the temporary public-private key pair #1 includes a tempSK #1 and a tempPK #1.

S114: The vehicle interior component #1 calculates a Sign #1, where Sign #1=Sign(ID #1||random #1||tempPK #1).

S115: The vehicle interior component #1 sends a change cipher specification (ChangeCipherSpec) to the vehicle interior component #2, where the change cipher specification includes the device certificate #1, the tempPK #1, and the Sign #1.

S116: The vehicle interior component #1 calculates a pre-shared key (PSK) #1 based on a key derivation function (KDF), where PSK #1=KDF(ID #1, ID #2, tempSK #1, tempPK #2).

S117: The vehicle interior component #1 calculates a session key (SessionKey) #1 based on the KDF, where SessionKey #1=KDF(PSK #1, random #1, random #2).

S118: The vehicle interior component #2 verifies validity of the device certificate #1.

S119: The vehicle interior component #2 verifies validity of the Sign #1.

S120: The vehicle interior component #2 calculates a PSK #2 based on the KDF, where PSK #2=KDF(ID #1, ID #2, tempSK #2, tempPK #1).

S121: The vehicle interior component #2 calculates a SessionKey #2 based on the KDF, where SessionKey #2=KDF(PSK #2, random #1, random #2).

As described above, the vehicle interior component #1 and the vehicle interior component #2 complete steps such as identity validity authentication, cryptographic algorithm suite negotiation, and SessionKey negotiation between the two parties in the handshake process. Further, the following step is included in the communication process.

S122: The vehicle interior component #1 and the vehicle interior component #2 each encrypt a communication packet by using the SessionKey for transmission.

Figure 2:
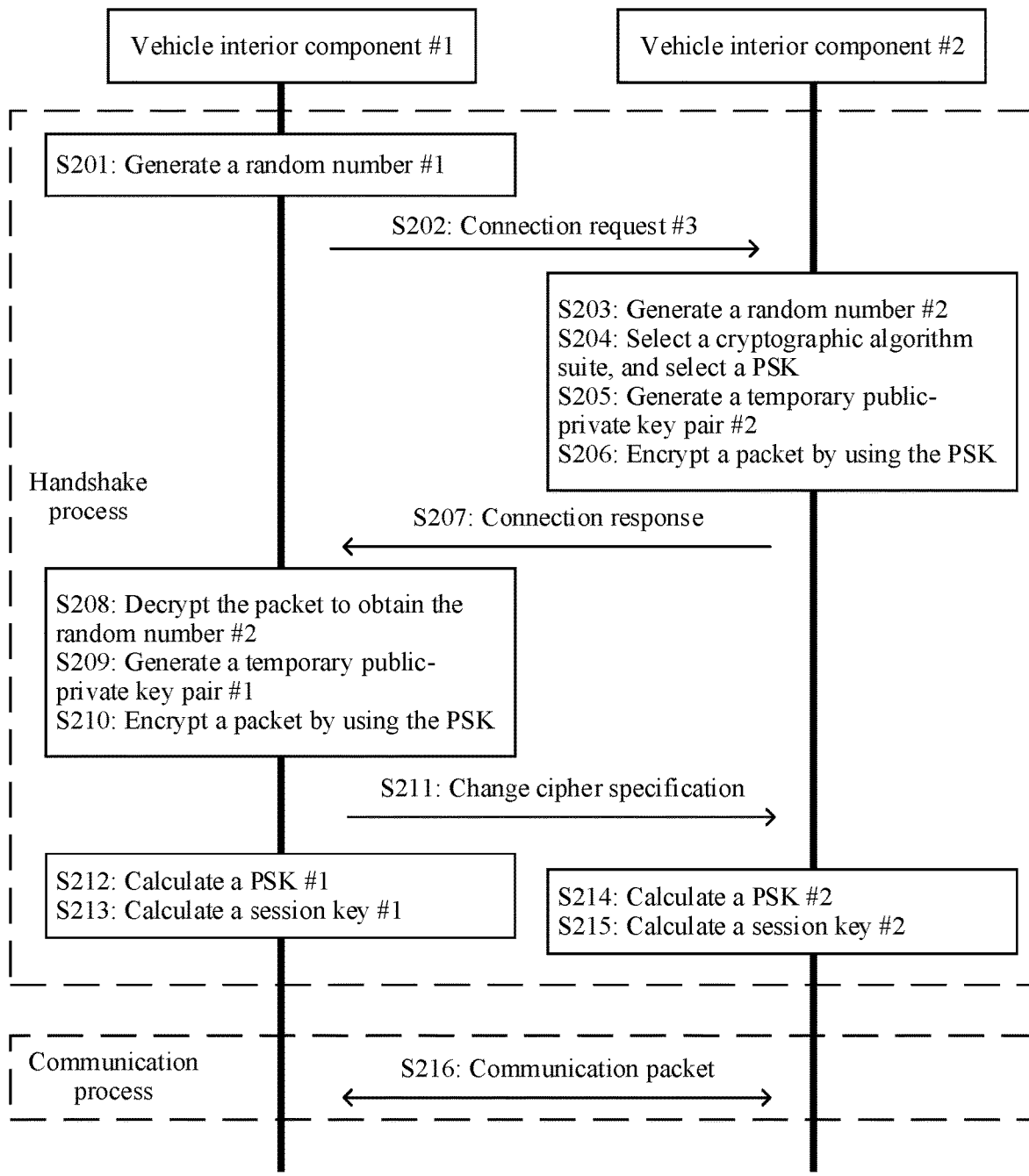
FIG. 2 is a schematic flowchart of a pre-shared key-based handshake process.

If the two communication parties have previously performed the handshake process and stores a same PSK, a handshake process can be simplified. FIG. 2 shows the PSK-based handshake process.

S201: The vehicle interior component #1 generates a random number #1.

S202: The vehicle interior component #1 sends a connection request #3 to the vehicle interior component #2, where the connection request #3 includes the random number #1, a list of cryptographic algorithm suites supported by the vehicle interior component #1, and a PSK_ID.

S203: The vehicle interior component #2 generates a random number #2.

S204: The vehicle interior component #2 selects a supported cryptographic algorithm suite in the list of cryptographic algorithm suites supported by the vehicle interior component #1, and selects the PSK based on the PSK_ID.

S205: The vehicle interior component #2 generates a temporary public-private key pair #2 based on the selected cryptographic algorithm suite, where the temporary public-private key pair includes a tempSK #2 and a tempPK #2.

S206: The vehicle interior component #2 encrypts a packet by using the PSK.

S207: The vehicle interior component #2 sends an encrypted connection response to the vehicle interior component #1, where the connection response includes the random number #2 and the tempPK #2.

S208: The vehicle interior component #1 decrypts the packet to obtain the random number #2.

S209: The vehicle interior component #1 generates a temporary public-private key pair #1, where the temporary public-private key pair #1 includes a tempSK #1 and a tempPK #1.

S210: The vehicle interior component #1 encrypts a packet by using the PSK.

S211: The vehicle interior component #1 sends an encrypted change cipher specification to the vehicle interior component #2, where the change cipher specification includes the tempPK #1.

S212: The vehicle interior component #1 calculates a pre-shared key (PSK) #1, where PSK #1=KDF(ID #1, ID #2, tempSK #1, tempPK #2).

S213: The vehicle interior component #1 calculates a SessionKey #1 based on the KDF, where SessionKey #1=KDF(PSK #1, random #1, random #2).

S214: The vehicle interior component #2 calculates a PSK #2 based on the KDF, where PSK #2=KDF(ID #1, ID #2, tempSK #2, tempPK #1).

S215: The vehicle interior component #2 calculates a SessionKey #2 based on the KDF, where SessionKey #2=KDF(PSK #2, random #1, random #2).

S216: The vehicle interior component #1 and the vehicle interior component #2 each encrypt a communication packet by using the SessionKey for transmission.

As described above, validity verification does not need to be performed on the device certificate in the PSK-based handshake process. This improves handshake efficiency.

However, in both an initial handshake process and a PSK-based handshake process, a data volume of the list of cryptographic algorithm suites transferred in a cryptographic algorithm suite negotiation phase is relatively large, and a data volume of the certificate transferred in an identity validity authentication phase in the initial handshake process is relatively large. As a result, it is easy to cause fragmented transmission of internet protocol (IP) packets in the handshake process, and transmission reliability and communication efficiency are affected.

In addition, in an intra-vehicle network scenario, transmission of the large volume of data between the different vehicle interior components increases a load of a vehicle interior forwarding component, the existing cryptographic algorithm suite is incompatible with a hardware capability of the vehicle interior component. As a result, deployment is difficult and real-time performance is poor. A connection needs to be established between the different vehicle interior components based on a transmission control protocol (TCP), but establishment of connections between a large quantity of vehicle interior components when a vehicle is powered on may result in bus congestion or an overload of a central node. The TLS protocol cannot be applied to a user datagram protocol (UDP). In addition, after a secure channel between the different vehicle interior components is established, all to-be-transmitted data needs to be encrypted, but there is much data (for example, a vehicle control instruction) in the vehicle whose integrity needs to be ensured and that does not need to be encrypted. Consequently, encryption of all the data causes a waste of computing resources, and an attack risk increases if a session key is used too many times.

The DTLS protocol is obtained through modification on the TLS protocol to adapt to the UDP protocol. Packet loss and packet disorder may occur due to the unreliable UDP protocol. To handle these situations, the DTLS protocol has the following changes based on the TLS protocol.

(1) A packet timeout retransmission mechanism is added to DTLS to handle the packet loss.

(2) An unencrypted sequence number is stored in a DTLS packet to handle the packet disorder.

(3) DTLS skips supporting a stream encryption algorithm. That is, a cryptographic algorithm suite supported by DTLS is a subset of a cryptographic algorithm suite supported by TLS.

In addition to the differences above, a procedure of the DTLS protocol is the same as a procedure of the TLS protocol.

Because the DTLS protocol is used for the UDP protocol, the packet loss may occur, and the large volume of data of the list of cryptographic algorithm suites and the device certificates are transmitted in the handshake process, this has greater adverse impact on transmission reliability and communication efficiency.

In addition, in the intra-vehicle network scenario, transmission of the large volume of data between the different vehicle interior components increases the load of the vehicle interior forwarding component, and the existing cryptographic algorithm suite is incompatible with the hardware capability of the vehicle interior component. As a result, deployment is difficult and real-time performance is poor. In the pursuit of high real-time in-vehicle communication, the stream encryption algorithm is a common and efficient encryption method, but the DTLS protocol does not support the stream encryption algorithm. In addition, after the secure channel between the different vehicle interior components is established, all the to-be-transmitted data needs to be encrypted, but there is much data (for example, the vehicle control instruction) in the vehicle whose integrity needs to be ensured and that does not need to be encrypted. Consequently, encryption of all the data causes a waste of the computing resources, and the attack risk increases if the session key is used too many times.

Based on this, embodiments of this application provide a communication method, to reduce an interaction process and a communication data volume in the handshake process, thereby improving transmission efficiency and communication quality.

Figure 3:
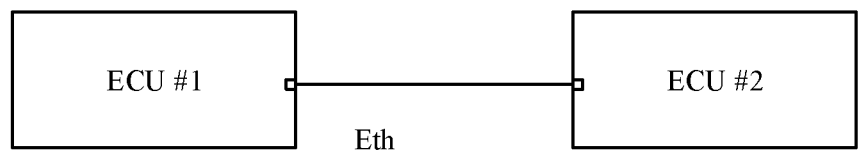
FIG. 3 and FIG. 4 each are a schematic diagram of a communications system to which a method according to an embodiment of this application is applicable.

FIG. 3 is a schematic diagram of a communications system to which a communication method according to an embodiment of this application is applicable. As shown in FIG. 3, the method provided in this embodiment of this application may be applied to a scenario in which secure communication is performed between vehicle interior components of an intelligent connected vehicle over automotive Ethernet. For example, an electronic control unit (ECU) #1 and an ECU #2 shown in FIG. 3 communicate with each other over the automotive Ethernet.

The vehicle interior component may include a remote information processor, for example, a telematics box (T-Box), a gateway (GW), an advanced driver assistance system (ADAS), a human-machine interface (HMI), or a vehicle control unit (VCU), that communicates with the outside.

Figure 4:
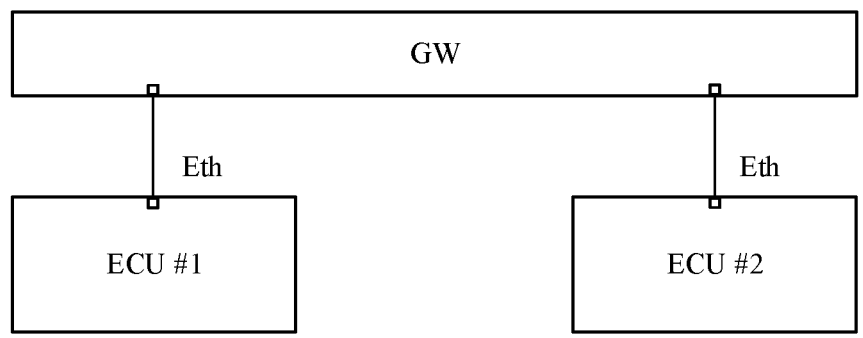

As shown in FIG. 3, the two vehicle interior components may be directly connected. Alternatively, the two vehicle interior components may perform transfer by using another vehicle interior component. As shown in FIG. 4, the ECU #1 and the ECU #2 are connected through a GW.

The method provided in embodiments of this application is described below with reference to the accompanying drawings.

Figure 5:
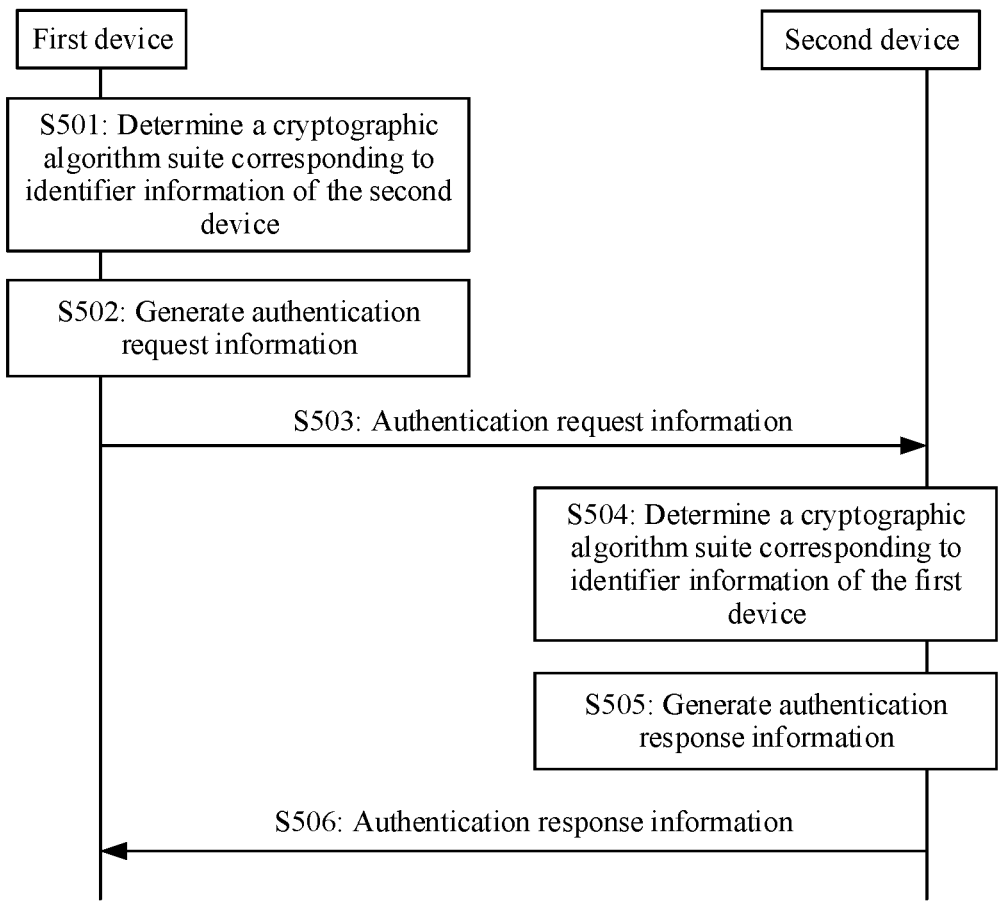
FIG. 5 to FIG. 7 each are a schematic flowchart of a communication method according to an embodiment of this application.

FIG. 5 is a schematic flowchart of a communication method according to an embodiment of this application. The method 500 shown in FIG. 5 may be applied to the communications system shown in FIG. 3 or FIG. 4. As shown in FIG. 5, a first device may be the ECU #1 in FIG. 3 or FIG. 4, and a second device may be the ECU #2 in FIG. 3 or FIG. 4. As shown in FIG. 5, the method 500 may include S501 to S506. The following describes the steps in detail.

S501: The first device determines, based on a third mapping relationship, a cryptographic algorithm suite corresponding to identifier information of the second device.

It may be understood that the cryptographic algorithm suite corresponding to the identifier information of the second device is a cryptographic algorithm suite used for communication between the first device and the second device.

The first device or the second device may be a T-Box, a GW, an ADAS, an HMI, a VCU, or the like.

The third mapping relationship is used to indicate a correspondence between identifier information of at least one device and at least one cryptographic algorithm suite.

The identifier information of the at least one device may be identifier information of a device that needs to be authenticated by the first device. In other words, the first device may determine, based on the third mapping relationship, the cryptographic algorithm suite used for communication with the device that needs to be authenticated. It may be understood that the identifier information of the at least one device includes the identifier information of the second device.

Optionally, if the first device may determine, based on the third mapping relationship, the cryptographic algorithm suite corresponding to the identifier information of the second device, the first device may consider by default that the second device is the device that needs to be authenticated, that is, may determine authenticity of the second device.

Identifier information of a device may include one or more of the following: a type of the device, an identifier (ID) of the device, an internet protocol (IP) address of the device, and a media access control (MAC) address of the device.

The correspondence between the identifier information of the at least one device and the at least one cryptographic algorithm suite is not limited in this embodiment of this application.

In an example, the identifier information of the at least one device and the at least one cryptographic algorithm suite may be in a one-to-one correspondence. Table 1 shows the example in which the identifier information of the at least one device is in the one-to-one correspondence with the at least one cryptographic algorithm suite.

TABLE 1

| Identifier information of a device | Cryptographic algorithm suite |
|---|---|
| Device #A | Cryptographic algorithm suite #A |
| Device #B | Cryptographic algorithm suite #B |
| Device #C | Cryptographic algorithm suite #C |
| Device #D | Cryptographic algorithm suite #D |

According to Table 1, the first device may determine that the identifier information of the device #A corresponds to the cryptographic algorithm suite #A, the identifier information of the device #B corresponds to the cryptographic algorithm suite #B, the identifier information of the device #C corresponds to the cryptographic algorithm suite #C, and the identifier information of the device #D corresponds to the cryptographic algorithm suite #D.

In another example, the identifier information of the at least one device and the at least one cryptographic algorithm suite may be in a many-to-one correspondence. Table 2 shows the example in which the identifier information of the at least one device is in the many-to-one correspondence with the at least one cryptographic algorithm suite.

TABLE 2

| Identifier information of a device | Cryptographic algorithm suite |
|---|---|
| Device #A | Cryptographic algorithm suite #A |
| Device #B | |
| Device #C | |
| Device #D | Cryptographic algorithm suite #B |

According to Table 2, the first device may determine that the identifier information of the device #A, the identifier information of the device #B, and the identifier information of the device #C all correspond to the cryptographic algorithm suite #A, and the identifier information of the device #D corresponds to the cryptographic algorithm suite #B.

The correspondence, between the identifier information of the at least one device and the at least one cryptographic algorithm suite, indicated in the third mapping relationship may be determined based on hardware capabilities of the first device and the at least one device. For example, if the first device and the device #A each have a hardware security module (HSM) of an electronic safety vehicle intrusion protected application (EVITA) full level, the cryptographic algorithm suite used by the first device to perform secure communication with the device #A may be determined as ECDHE_ECDSA_AES_128_GCM_Whirlpool. In other words, the identifier information of the device #A may correspond to ECDHE_ECDSA_AES_128_GCM_Whirlpool, where ephemeral elliptic curve Diffie-Hellman (ECDHE) represents a key agreement algorithm, an elliptic curve digital signature algorithm (ECDSA) represents a digital signature algorithm, an advanced encryption standard (AES)_128_ (galois/counter mode, GCM) represents an authentication encryption algorithm, and a Whirlpool algorithm is a hash algorithm; and all these algorithms are specified in the HSM of the EVITA full level.

The third mapping relationship may be pre-stored in the first device. For example, the third mapping relationship may be pre-stored in the first device when a device manufacturer generates the first device; or the third mapping relationship may be pre-stored in the first device before a user uses the first device; or the third mapping relationship may be pre-stored in the first device by a software provider.

In this embodiment of this application, the cryptographic algorithm suite corresponds to the identifier information of the device, so that the first device can determine, based on the stored third mapping relationship, the cryptographic algorithm suite used for communication with the second device. Therefore, the first device does not need to transmit a list of cryptographic algorithm suites supported by the first device to the second device. This reduces a volume of data to be transmitted.

Optionally, each of the at least one cryptographic algorithm suite meets a forward security requirement. That is, when a cryptographic algorithm suite used for communication with the first device and the at least one other device is defined, only a key agreement algorithm that meets the forward security requirement is used, for example, ephemeral Diffie-Hellman (DHE) or ECDHE is used.

S502: The first device generates authentication request information based on the determined cryptographic algorithm suite.

That the first device generates the authentication request information based on the determined cryptographic algorithm suite may be understood as that the first device generates, based on the determined cryptographic algorithm suite, a parameter included in the authentication request information.

The authentication request information includes identifier information of the first device (an ID #1 is used as an example below for description). The authentication request information may further include one or more of the following parameters: a first temporary public key used by the first device (a tempPK #1 is used as an example below for description), a first random number used by the first device (a random #1 is used as an example below for description), a device certificate of the first device (a device certificate #1 is used as an example below for description), a first signature value used by the first device (a Sign #1 is used as an example below for description), and a first cipher (a cipher #1 is used as an example below for description). The random #1 and the tempPK #1 are used to generate a session key used for communication between the first device and the second device, and the device certificate #1, the Sign #1, and the cipher #1 are used to verify validity of the first device.

The device certificate #1 includes the ID #1, a first public key (a PK #1 is used as an example below for description) used by the first device, and a root signature. It may be understood that, because the device certificate #1 includes the ID #1, the authentication request information may not include the identifier information of the first device. In this case, it may be understood that the identifier information of the first device is included in the device certificate #1.

The tempPK #1 is generated by the first device based on the determined cryptographic algorithm suite. The first device generates a first temporary public-private key pair based on the key agreement algorithm in the cryptographic algorithm suite, and the first temporary public-private key pair includes two pieces of data: the tempPK #1 and a first temporary private key (a tempSK #1 is used as an example below for description).

The Sign #1 is generated by the first device based on the determined cryptographic algorithm suite. The first device constructs a first message (a msg #1 is used as an example below for description), and content in the msg #1 is {ID #1||random #1||tempPK #1}. Further, the first device encrypts the msg #1 by using a used first private key (an SK #1 is used as an example below for description) as a key and based on the digital signature algorithm specified in the cryptographic algorithm suite to obtain the Sign #1. Sign #1=Sign(ID #1||random #1||tempPK #1), where "||" indicates a connection, and Sign( ) indicates that calculation is performed based on the digital signature algorithm.

The cipher #1 is generated by the first device based on a pre-stored PSK and the cryptographic algorithm suite. The pre-stored PSK corresponds to the second device.

The first device constructs a msg #1, and content in the msg #1 is {ID #1||random #1}. Further, the first device encrypts the msg #1 by using the PSK as a key and based on the symmetric encryption algorithm in the cryptographic algorithm suite, to generate the cipher #1. Cipher #1=$\text{Enc}_{PSK}$(ID #1||random #1), where "||" indicates a connection, and $\text{Enc}_{PSK}$( ) indicates that encryption is performed by using the PSK as the key and based on the symmetric encryption algorithm.

The pre-stored PSK may be generated by the first device in a previous process in which the first device performs identity authentication with the second device.

It may be understood that if the first device and the second device have previously performed the identity authentication process, the first device and the second device may store the same PSK. The first device may determine, based on the identifier information (an ID #2 is used as an example below for description) of the second device, the PSK corresponding to the second device from one or more stored PSKs.

Alternatively, the pre-stored PSK may be a PSK stored in a first PSK list pre-configured in the first device. The pre-configured first PSK list may include a PSK corresponding to identifier information of at least one device. The pre-configured first PSK list may be understood as that the first PSK list is pre-stored in the first device. For example, the first PSK list may be pre-stored in the first device when the device manufacturer generates the first device; or the first PSK list may be pre-stored in the first device before the user uses the first device; or the first PSK list may be pre-stored in the first device by the software provider.

In this case, the first device may determine the PSK corresponding to the ID #2 from the pre-configured first PSK list.

Figure 6:
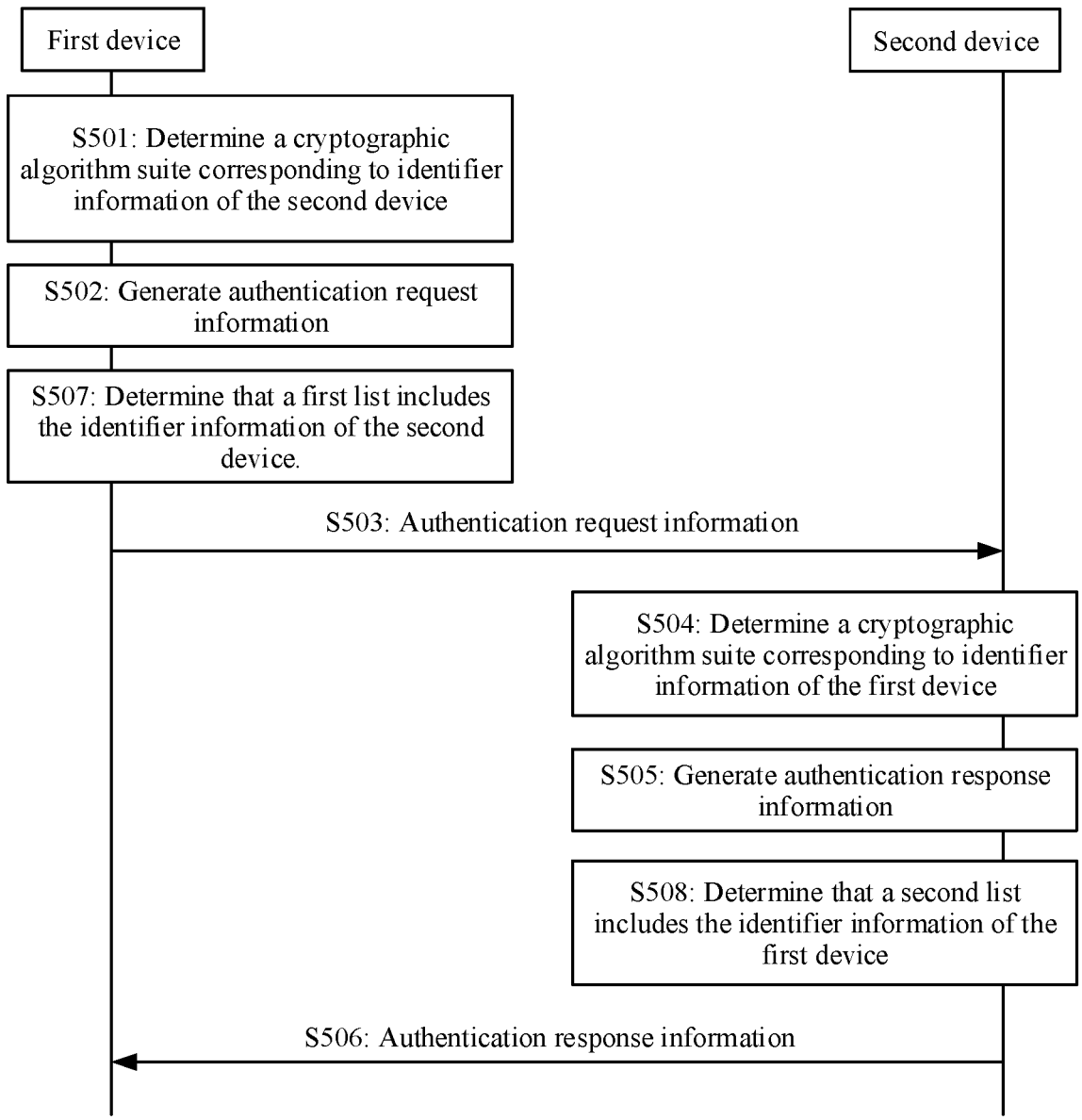

Optionally, as shown in FIG. 6, the method 500 may further include S507: The first device determines that a pre-configured first list includes the identifier information of the second device. The pre-configured first list may be understood as that the first list is pre-stored in the first device. For example, the first list may be pre-stored in the first device when the device manufacturer generates the first device; or the first list may be pre-stored in the first device before the user uses the first device; or the first list may be pre-stored in the first device by the software provider.

It should be noted that, only an example in which S507 is performed after S502 is used for description in the figure, and should not constitute a limitation on this application. S507 may alternatively be performed before S502 or S501. Alternatively, S507 and S501 may be one step.

The first list defines an authentication process of a device with which the first device needs to perform secure communication, that is, the first list includes identifier information of a device that needs to be authenticated by the first device.

Content in the first list may be determined based on an application scenario of the first device. For example, if the first device is an ADAS, in an autonomous driving service function, the ADAS needs to perform secure communication with devices such as an HMI, a VCU, a vehicle body domain controller, a chassis domain controller, and a sensor. Therefore, identifier information of the foregoing devices may be stored in the first list pre-configured in the ADAS.

Before the first device generates or sends the authentication request information, the first device may query whether the pre-configured first list stores the identifier information of the second device.

If the first list stores the identifier information of the second device, it indicates that the first device needs to perform identity authentication on the second device, and the first device initiates the authentication process to the second device. For example, when determining that the first list includes the identifier information of the second device, the first device generates the authentication request information, or sends the authentication request information to the second device.

If the first list does not store the identifier information of the second device, it indicates that the first device does not need to perform the identity authentication with the second device, and the first device does not initiate the authentication process to the second device. For example, when determining that the first list does not include the identifier information of the second device, the first device does not generate the authentication request information, or does not send the authentication request information to the second device.

It should be further noted that the foregoing solution in which the first device determines that the first list includes the identifier information of the second device may also be separately implemented, that is, may be used as an independent embodiment without depending on another embodiment in this specification.

In this embodiment of this application, the first list is preset in the first device, so that the first device sends the authentication request information to the second device when determining that the identifier information of the second device is stored in the first list. This can avoid initiation of an unnecessary authentication request.

Figure 7:
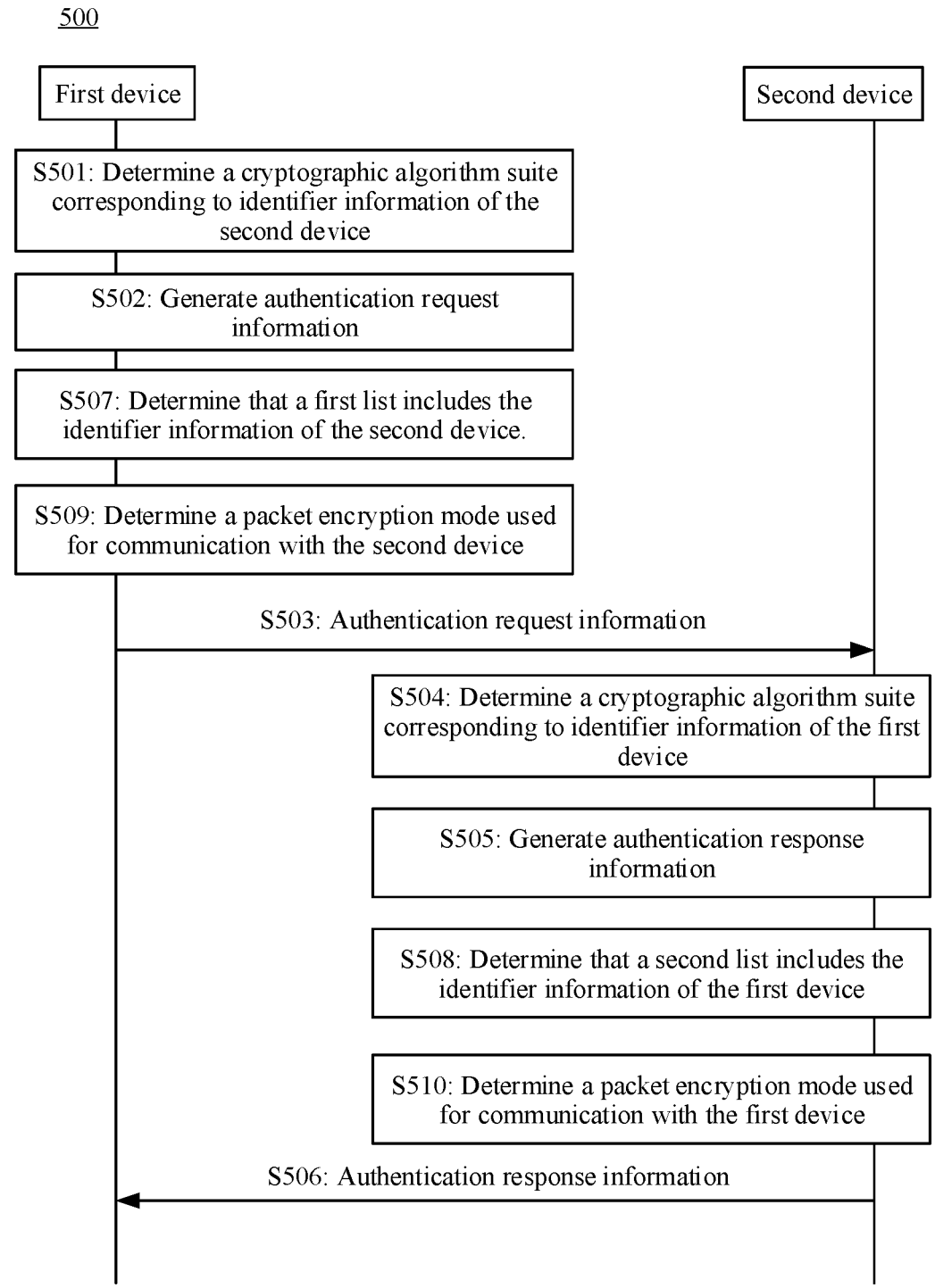

Optionally, as shown in FIG. 7, the method 500 may further include S509: The first device determines a packet encryption mode used for communication with the second device.

It should be noted that only an example in which S509 is performed after S507 is used for description in the figure, and should not constitute a limitation on this application. Alternatively, S509 may be performed before S507, or may be performed before S502, or may be performed before S501, or S509 may be performed after S503. Alternatively, S509 and S507 may be one step, or S509 and S501 may be one step.

The packet encryption mode includes one of a full encryption mode and an on-demand encryption mode.

If the packet encryption mode used for communication between the first device and the second device is the full encryption mode, a communication packet sent between the first device and the second device may include ciphertext data.

The ciphertext data is data obtained by encrypting communication data by the first device and the second device based on the cryptographic algorithm suite.

Figure 8:
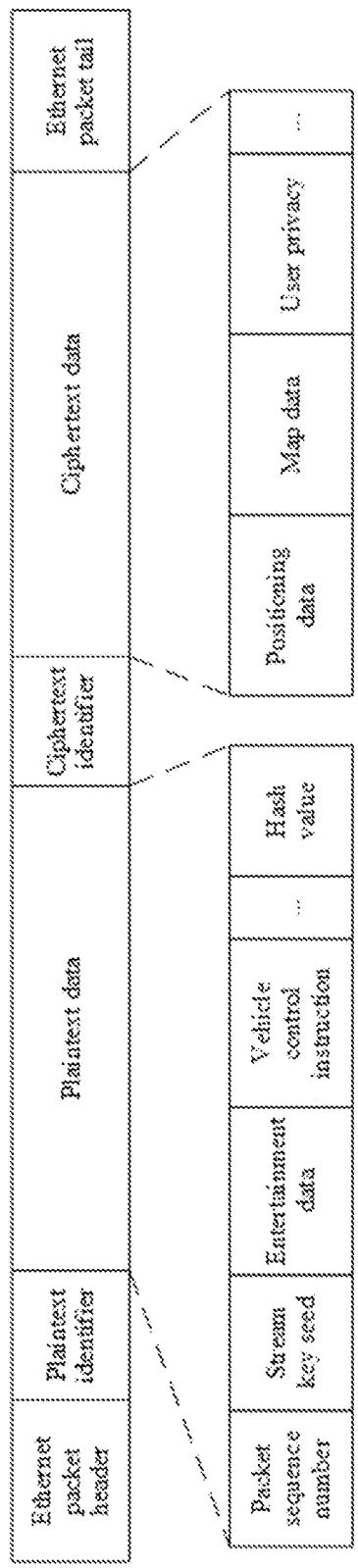
FIG. 8 is a schematic diagram of a format of a communication packet in an on-demand encryption mode according to an embodiment of this application.

FIG. 8 shows a format of the communication packet in the full encryption mode. As shown in FIG. 8, in the full encryption mode, only a packet sequence number is not encrypted, and all other data is the ciphertext data.

If the packet encryption mode used for communication between the first device and the second device is the on-demand encryption mode, a communication packet sent between the first device and the second device includes a plaintext identifier, plaintext data, a ciphertext identifier, and ciphertext data.

The plaintext identifier is used to identify a length of the plaintext data, or is used to indicate that a field following the plaintext identifier is the plaintext data. The plaintext data is data that is not encrypted.

Optionally, the plaintext data may include a stream encryption key generation seed of the ciphertext data.

Figure 9:
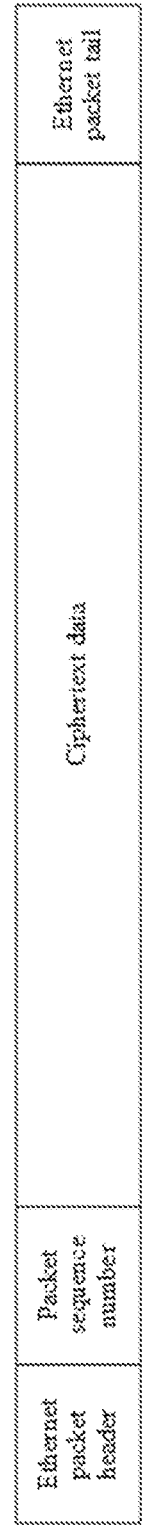
FIG. 9 is a schematic diagram of a format of a communication packet in a full encryption mode according to an embodiment of this application.

FIG. 9 shows a format of the communication packet, in the on-demand encryption mode, sent between the first device and the second device. It can be seen from FIG. 9 that, data after the plaintext identifier and before the ciphertext identifier is the plaintext data, and data after the ciphertext identifier is the ciphertext data. The plaintext data may include a packet sequence number, a stream key seed, entertainment data, a vehicle control instruction, a hash value, and the like. The ciphertext data may include positioning data, map data, user privacy, and the like.

A manner in which the first device determines the packet encryption mode is not limited in this embodiment of this application.

In an example, the first device may determine the packet encryption mode based on data content transmitted between the first device and the second device. For example, if map data, positioning data, and the like is transmitted between the first device and the second device, it is determined that the packet encryption mode is the full encryption mode. If entertainment data, a control instruction, and the like are further transmitted between the first device and the second device in addition to data such as map data, it is determined that the packet encryption mode is the on-demand encryption mode, that is, the data such as the map data is encrypted, and the entertainment data, the control instruction, and the like are not encrypted.

Further, the first device may send indication information to the second device, to indicate the packet encryption mode used for communication with the second device. For example, the indication information sent by the first device may be a Boolean (bool) variable. If the Boolean variable is "1", it indicates that the packet encryption mode used for communication between the first device and the second device is the full encryption mode. If the Boolean variable is "0", it indicates that the packet encryption mode used for communication between the first device and the second device is the on-demand encryption mode. Optionally, the indication information may be carried in the authentication request information.

In another example, the first device may determine, based on a fourth mapping relationship, the packet encryption mode corresponding to the identifier information of the second device, where the fourth mapping relationship is used to indicate a correspondence between identifier information of at least one device and at least one packet encryption mode.

The correspondence between the identifier information of the at least one device and the at least one packet encryption mode is not limited in this embodiment of this application.

For example, the identifier information of the at least one device and the at least one packet encryption mode may be in a one-to-one correspondence. Table 3 shows the example in which the identifier information of the at least one device is in the one-to-one correspondence with the at least one packet encryption mode.

TABLE 3

| Identifier information of a device | Packet encryption mode |
|---|---|
| Device #A | Full encryption mode |
| Device #B | Full encryption mode |
| Device #C | On-demand encryption mode |
| Device #D | On-demand encryption mode |

According to Table 3, the first device may determine that the identifier information of the device #A and the device #B each corresponds to the full encryption mode, and the identifier information of the device #C and the device #D each corresponds to the on-demand encryption mode.

For another example, the identifier information of the at least one device and the at least one packet encryption mode may be in a many-to-one correspondence. Table 4 shows the example in which the identifier information of the at least one device is in the many-to-one correspondence with the at least one packet encryption mode.

According to Table 4, the first device may determine that both identifier information of a device #A and identifier information of a device #B correspond to the full encryption mode, and both identifier information of a device #C and identifier information of a device #D correspond to the on-demand encryption mode.

TABLE 4

| Identifier information of a device | Packet encryption mode |
|---|---|
| Device #A | Full encryption mode |
| Device #B | |
| Device #C | On-demand encryption mode |
| Device #D | |

It should be further noted that the foregoing solution in which the first device determines the packet encryption mode used for communication with the second device may also be implemented separately, that is, may be used as an independent embodiment without depending on another embodiment in this specification.

In this embodiment of this application, the on-demand encryption mode of the communication packet is defined, so that data that does not need to be encrypted can be transmitted in plaintext in the on-demand encryption mode. This reduces a data volume of an encryption payload, improves an encryption rate, and improves communication efficiency. In the on-demand encryption mode, the stream encryption key generation seed of the ciphertext data can be stored in the plaintext data, so that a UDP protocol can support the stream encryption algorithm. This further improves communication efficiency.

It should be understood that the foregoing descriptions are provided by using an example in which the first device separately stores the third mapping relationship, the first list, the first PSK list, and the fourth mapping relationship, and should not constitute a limitation on this embodiment of this application.

Information indicated in the third mapping relationship, information indicated in the fourth mapping relationship, content included in the first PSK list, and content included in the first list may be stored in a same list; or one or more pieces of information indicated in the third mapping relationship, information indicated in the fourth mapping relationship, content included in the first PSK list, and content included in the first list may be stored in a same list.

Table 5 shows an example in which the information indicated in the third mapping relationship, the information indicated in the fourth mapping relationship, the content included in the first PSK list, and the content included in the first list are stored in the same list.

TABLE 5

| Identifier information of a device | Cryptographic algorithm suite | PSK | Packet encryption mode |
|---|---|---|---|
| Device #A | Cryptographic algorithm suite #1 | PSK #1 | Full encryption mode |
| Device #B | Cryptographic algorithm suite #2 | PSK #2 | Full encryption mode |
| Device #C | Cryptographic algorithm suite #3 | PSK #3 | On-demand encryption mode |
| Device #D | Cryptographic algorithm suite #4 | PSK #4 | On-demand encryption mode |

The identifier information of the device #A to the device #D is identifier information of devices that need to be authenticated by the first device. Table 5 shows the cryptographic algorithm suite #1 to the cryptographic algorithm suite #4, the PSK #1 to the PSK #4, and the packet encryption modes that respectively correspond to the identifier information of the device #A to the device #D.

S503: The first device sends the authentication request information to the second device. Correspondingly, in S503, the second device receives the authentication request information from the first device.

The authentication request information may include one or more of the following parameters: the ID #1, the tempPK #1, the random #1, the device certificate #1, the Sign #1, and the cipher #1.

For example, in a scenario of one-way authentication between the first device and the second device, the authentication request information may include the ID #1, the tempPK #1, and the random #1.

One-way authentication is performed by the first device on the second device, that is, the first device authenticates validity of the second device, but the second device does not authenticate validity of the first device. For example, in an autonomous driving scenario, it is assumed that the first device is an intelligent driving domain controller and the second device is a sensor. Before the intelligent driving domain controller communicates with the intra-domain sensor, the intelligent driving domain controller needs to authenticate the sensor to prevent the sensor from sending forged data, but the sensor does not need to authenticate the intelligent driving domain controller.

For another example, when the first device and the second device perform two-way authentication, the authentication request information may include the device certificate #1, the Sign #1, the tempPK #1, and the random #1.

Two-way authentication is performed between the first device and the second device, that is, the first device authenticates validity of the second device, and the second device also authenticates validity of the first device.

For still another example, when the first device pre-stores the PSK corresponding to the second device, the authentication response information may include the ID #1, the cipher #1, and the tempPK #1.

S504: The second device determines, based on a first mapping relationship, a cryptographic algorithm suite corresponding to the identifier information of the first device.

It may be understood that the cryptographic algorithm suite corresponding to the identifier information of the first device is a cryptographic algorithm suite used for communication between the first device and the second device.

The first mapping relationship is used to indicate a correspondence between identifier information of at least one device and at least one cryptographic algorithm suite. Specifically, for a description of the first mapping relationship, refer to the description of the third mapping relationship in S501. For brevity, details are not described again in this embodiment of this application.

It may be understood that the cryptographic algorithm suite determined in step S504 is the same as the cryptographic algorithm suite determined in step S501.

The first mapping relationship may be pre-stored in the second device. For example, the first mapping relationship may be pre-stored in the second device when a device manufacturer generates the second device; or the first mapping relationship may be pre-stored in the second device before a user uses the second device; or the first mapping relationship may be pre-stored in the second device by a software provider.

Optionally, if the second device may determine, based on the first mapping relationship, the cryptographic algorithm suite corresponding to the identifier information of the first device, the second device may consider by default that the first device is a device that needs to be authenticated, that is, may determine authenticity of the first device.

In this embodiment of this application, the cryptographic algorithm suite corresponds to the identifier information of the device, so that the second device can determine, based on the stored first mapping relationship, the cryptographic algorithm suite used in a process of communicating with the first device. Therefore, the first device does not need to transmit cryptographic algorithm suites supported by the first device to the second device. This reduces a volume of data in a transmission process, and improves transmission reliability and communication efficiency.

Optionally, each of the at least one cryptographic algorithm suite meets a forward security requirement.

As described above, when two-way authentication is performed between the first device and the second device, the authentication request information sent by the first device to the second device may include the device certificate #1 and/or the Sign #1. Before determining the cryptographic algorithm suite, the second device may first verify validity of the device certificate #1.

The second device performs signature verification on the root signature stored in the device certificate #1 by using a second public key (a PK #2 is used as an example below for description) used by the second device in the root certificate. After verification succeeds, the second device determines the cryptographic algorithm suite.

After determining the cryptographic algorithm suite, the second device continues to verify validity of the Sign #1. The second device may construct a msg #1 based on the ID #1 included in the device certificate #1 and the random #1 and the tempPK #1 included in the authentication request information. Further, the second device verifies validity of the Sign #1 by using the PK #1 included in the device certificate #1. After verification succeeds, the second device performs a subsequent authentication process.

If the authentication request information includes the cipher #2, after determining the cryptographic algorithm suite, the second device decrypts the cipher #1 by using the pre-stored PSK corresponding to the identifier information of the first device as a key and based on the symmetric encryption algorithm in the cryptographic algorithm suite to obtain an ID #1. Further, the second device determines whether the ID #1 obtained by decrypting the cipher #1 is consistent with the ID #1 in the authentication request information. If the ID #1 is inconsistent with the ID #1, authentication fails. If the ID #1 is consistent with the ID #1, a subsequent authentication process continues. S505: The second device generates authentication response information based on the determined cryptographic algorithm suite.

The authentication response information may include one or more of the following parameters:

the identifier information of the second device (the ID #2 is used as an example below for description), a second random number used by the second device (a random #2 is used as an example below for description), a second device certificate of the second device (a device certificate #2 is used as an example below for description), a second signature value used by the second device (a Sign #1 is used as an example below for description), a second temporary public key used by the second device (a tempPK #2 is used as an example below for description), and a second cipher (a cipher #2 is used as an example below for description). The device certificate #2 includes the ID #2, a PK #2, and a root signature. The random #2 and the tempPK #2 are used to generate a session key used for communication between the first device and the second device, and the device certificate #2, the Sign #2, and the cipher #2 are used to verify validity of the second device.

That the second device may generate the authentication response information based on the determined cryptographic algorithm suite may be understood that the second device generates the parameter included in the authentication response information.

The second device may generate a second temporary public-private key pair based on the determined cryptographic algorithm suite, and the second temporary public-private key pair includes two pieces of data: the tempPK #2 and a second temporary private key (a tempSK #2 is used as an example below for description).

The second device may further construct a second message (a msg #2 is used as an example below for description), and content in the msg #2 is {ID #2||random #2||tempPK #2}. Further, the second device encrypts the msg #2 by using a used second private key (an SK #2 is used as an example below for description) as a key and based on the digital signature algorithm specified in the cryptographic algorithm suite to obtain the Sign #2. Sign #2=Sign(ID #2∥random #2∥tempPK #2), where "∥" indicates a connection, and Sign( ) indicates that calculation is performed based on the digital signature algorithm.

The second device may further generate the cipher #2 based on the pre-stored PSK and the cryptographic algorithm suite. The second device constructs a msg #2, and content in the msg #2 is {ID #2∥random #2}. Further, the second device encrypts the msg #2 by using the PSK as a key and based on the symmetric encryption algorithm in the cryptographic algorithm suite to generate a cipher #2. Cipher #2=$\text{Enc}_{PSK}$ (ID #2∥random #2), where "∥" indicates a connection, and $\text{Enc}_{PSK}$ ( ) indicates that encryption is performed by using the PSK as the key and based on the symmetric encryption algorithm.

The pre-stored PSK may be generated by the first device in a previous process in which the first device performs identity authentication with the second device.

It may be understood that if the first device and the second device have previously performed the identity authentication process, the first device and the second device store the same PSK. The second device may determine, based on the ID #1, the PSK corresponding to the first device from one or more stored PSKs.

Alternatively, the pre-stored PSK may be a PSK stored in a second PSK list pre-configured in the second device. The pre-configured second PSK list may include a PSK corresponding to identifier information of at least one device. The pre-configured second PSK list may be understood as that the second PSK list is pre-stored in the second device. For example, the first PSK list may be pre-stored in the second device when the device manufacturer generates the second device; or the second PSK list may be pre-stored in the second device before the user uses the second device; or the second PSK list may be pre-stored in the second device by the software provider.

In this case, the second device may determine the PSK corresponding to the ID #1 from the pre-configured second PSK list.

If the second device still does not determine validity of the first device after determining the cryptographic algorithm suite corresponding to the identifier information of the first device, the second device may temporarily not generate the foregoing parameter.

In this case, the second device may generate a cookie field, include the generated cookie field in the authentication response information, and send the authentication response information to the first device. Further, after receiving authentication request information that carries the cookie field and that is sent by the first device, the second device may determine authenticity and source validity of the first device based on the cookie field in the authentication request information.

Optionally, as shown in FIG. 6, the method 500 may further include S508: The second device determines that a pre-configured second list includes the identifier information of the first device. The pre-configured second list may be understood as that the second list is pre-stored in the second device. For example, the second list may be pre-stored in the second device when the device manufacturer generates the second device; or the second list may be pre-stored in the first device before the user uses the second device; or the second list may be pre-stored in the second device by the software provider.

It should be noted that, only an example in which S508 is performed after S505 is used for description in the figure, and should not constitute a limitation on this application. S508 may alternatively be performed before S505 or S504. Alternatively, S508 and S504 may be one step.

The second list defines an authentication process of a device with which the second device needs to perform secure communication, that is, the second list includes identifier information of a device that needs to be authenticated by the second device. Specifically, for a description of the second list, refer to the foregoing description of the first list in S507. For brevity, details are not described in this embodiment of this application again.

Before the second device generates or sends the authentication response information, the second device may query whether the pre-configured second list stores the identifier information of the first device.

If the second list stores the identifier information of the first device, it indicates that a source of the first device is valid, and the second device makes response to an authentication request from the first device. For example, when determining that the second list includes the identifier information of the first device, the second device generates the authentication response information, or sends the authentication response information to the second device.

If the second list does not store the identifier information of the first device, it indicates that a source of the first device is invalid, and the second device does not make response to an authentication request from the first device. For example, when determining that the second list does not include the identifier information of the first device, the second device does not generate the authentication response information, or does not send the authentication response information to the second device.

It should be further noted that the foregoing solution in which the second device determines that the second list includes the identifier information of the first device may also be separately implemented, that is, may be used as an independent embodiment without depending on another embodiment in this specification.

In this embodiment of this application, the second list is pre-configured in the second device, so that the second device can determine source validity of the first device when determining that the identifier information of the first device is stored in the second list, that is, the solution with the second list can replace a cookie field allocation solution in an original handshake process. A malicious device can be prevented from forging a false source to initiate an authentication process, and the second device can directly ignore an authentication request from the invalid device based on the second list. This can reduce a processing burden of the second device, and increase an attack difficulty of an attacker.

Optionally, as shown in FIG. 7, the method 500 may further include S510: The second device determines a packet encryption mode used for communication with the first device.

It should be noted that only an example in which S510 is performed after S508 is used for description in the figure, and should not constitute a limitation on this application. Alternatively, S510 may be performed before S508, or may be performed before S505, or may be performed before S504, or S510 may be performed after S506. Alternatively, S510 and S508 may be one step, or S509 and S504 may be one step.

The packet encryption mode includes one of a full encryption mode and an on-demand encryption mode.

If the packet encryption mode used for communication between the first device and the second device is the full encryption mode, a communication packet sent between the first device and the second device may include ciphertext data.

The ciphertext data is data obtained by encrypting communication data by the first device and the second device based on the cryptographic algorithm suite.

FIG. 8 shows a format of the communication packet in the full encryption mode. As shown in FIG. 8, in the full encryption mode, only a packet sequence number is not encrypted, and all other data is the ciphertext data.

If the packet encryption mode used for communication between the first device and the second device is the on-demand encryption mode, a communication packet sent between the first device and the second device includes a plaintext identifier, plaintext data, a ciphertext identifier, and ciphertext data.

The plaintext identifier is used to identify a length of the plaintext data, or is used to indicate that a field following the plaintext identifier is the plaintext data. The plaintext data is data that is not encrypted.

Optionally, the plaintext data may include a stream encryption key generation seed of the ciphertext data.

FIG. 9 shows a format of the communication packet in the on-demand encryption mode. It can be seen from FIG. 9 that, data after the plaintext identifier and before the ciphertext identifier is the plaintext data, and data after the ciphertext identifier is the ciphertext data. The plaintext data may include a packet sequence number, a stream key seed, entertainment data, a vehicle control instruction, a hash value, and the like. The ciphertext data may include positioning data, map data, user privacy, and the like.

A manner in which the second device determines the packet encryption mode is not limited in this embodiment of this application.

In an example, the second device may determine the packet encryption mode based on the indication information from the first device, where the indication information is used to indicate the packet encryption mode used for communication between the first device and the second device. For example, the indication information received by the second device from the first device may be a Boolean (bool) variable. If the Boolean variable is "1", it indicates that the packet encryption mode used for communication with the first device and the second device is the full encryption mode. If the Boolean variable is "0", it indicates that the packet encryption mode used for communication with the first device and the second device is the on-demand encryption mode.

In another example, the second device may determine, based on a second mapping relationship, the packet encryption mode corresponding to the identifier information of the first device, where the second mapping relationship is used to indicate a correspondence between identifier information of at least one device and at least one packet encryption mode. Specifically, for a description of the second mapping relationship, refer to the description of the fourth mapping relationship in S509. For brevity, details are not described again in this embodiment of this application.

It should be further noted that the foregoing solution in which the second device determines the packet encryption mode used for communication with the first device may also be implemented separately, that is, may be used as an independent embodiment without depending on another embodiment in this specification.

In this embodiment of this application, the on-demand encryption mode of the communication packet is defined, so that data that does not need to be encrypted can be transmitted in plaintext in the on-demand encryption mode. This reduces a data volume of an encryption payload, improves an encryption rate, and improves communication efficiency. In the on-demand encryption mode, the stream encryption key generation seed of the ciphertext data can be stored in the plaintext data, so that a UDP protocol can support the stream encryption algorithm. This further improves communication efficiency.

It should be understood that the foregoing descriptions are provided by using an example in which the second device separately stores the first mapping relationship, the second list, the second PSK list, and the second mapping relationship, and should not constitute a limitation on this embodiment of this application.

Information indicated in the first mapping relationship, information indicated in the second mapping relationship, content included in the second PSK list, and content included in the second list may be stored in a same list; or one or more pieces of information indicated in the first mapping relationship, information indicated in the second mapping relationship, content included in the second PSK list, and content included in the second list may be stored in a same list.

Table 6 shows an example in which the information indicated in the first mapping relationship, the information indicated in the second mapping relationship, the content included in the second PSK list, and the content included in the second list are stored in the same list.

TABLE 6

| Identifier information of a device | Cryptographic algorithm suite | PSK | Packet encryption mode |
|---|---|---|---|
| Device #E | Cryptographic algorithm suite #1 | PSK #1 | Full encryption mode |
| Device #F | Cryptographic algorithm suite #2 | PSK #2 | Full encryption mode |
| Device #G | Cryptographic algorithm suite #3 | PSK #3 | On-demand encryption mode |
| Device #H | Cryptographic algorithm suite #4 | PSK #4 | On-demand encryption mode |

The identifier information of the device #E to the device #H is identifier information of devices that need to be authenticated by the second device. Table 6 shows the cryptographic algorithm suite #1 to the cryptographic algorithm suite #4, the PSK #1 to the PSK #4, and the packet encryption modes that respectively correspond to the identifier information of the device #E to the device #H.

S506: The second device sends the authentication response information to the first device.

The authentication response information may include one or more of the following parameters: the random #2, the device certificate #2, the Sign #1, the tempPK #2, the cipher #2, and the ID #2.

For example, when the second device determines that the source of the first device is valid, the authentication response information may include the random #2, the device certificate #2, the Sign #1, and the tempPK #2.

For another example, when the second device pre-stores the PSK corresponding to the first device, the authentication response information may include the ID #2, the tempPK #2, and the cipher #2.

Correspondingly, in S506, after receiving the authentication response information from the second device, the first device may verify validity of the second device.

If the authentication response information includes the device certificate #2, the first device verifies validity of the device certificate #2. The first device queries the pre-configured first list based on the ID #2 stored in the device certificate #2, to determine whether the second device is a device that needs to be authenticated. If the second device is not the device that needs to be authenticated, authentication is terminated; or if the second device is the device that needs to be authenticated, the first device performs signature verification on the root signature in the device certificate #2 by using the PK #1 in the root certificate.

If the authentication response information includes the Sign #2, the first device continues to verify the Sign #2. The first device may construct the msg #2 based on the ID #2 included in the device certificate #2 and the random #2 and the tempPK #2 included in the authentication response information. Further, the second device verifies validity of the Sign #2 by using the PK #2 included in the device certificate #2.

If the authentication response information includes the cipher #2, the first device decrypts the cipher #2 by using the pre-stored PSK corresponding to the second device as a key and based on the symmetric encryption algorithm in the cryptographic algorithm suite to obtain an ID #2. Further, the first device determines whether the ID #2 obtained by decrypting the cipher #2 is consistent with the ID #2 in the authentication response information. If the ID #2 is inconsistent with the ID #2, authentication fails. If the ID #2 is consistent with the ID #2, authentication succeeds.

After completing the identity authentication procedure and exchanging the random number and the temporary public key that are used by the two parties, the first device and the second device calculate, based on the existing procedure, the PSK and the session key that are used in the current secure communication, and subsequently, perform a communication process.

In this embodiment of this application, the cryptographic algorithm suite corresponds to the identifier information of the device, so that the first device and the second device can determine, based on the stored mapping relationship, the cryptographic algorithm suite used in the communication process. There is no need to transfer the list of supported cryptographic algorithm suites in the handshake process between the first device and the second device. This reduces a volume of data transmitted in the handshake process, improves transmission reliability and communication efficiency, and further reduces a burden of a forwarding component when the first device communicates with the second device by using the forwarding component.

In this embodiment of this application, the second list is pre-configured in the second device, so that the second device can determine source validity of the first device when determining that the identifier information of the first device is stored in the second list, that is, the solution with the second list can replace the cookie field allocation solution in the original handshake process. The malicious device can be prevented from forging the false source to initiate the authentication process, and the second device can directly ignore the authentication request from the invalid device based on the second list. This can reduce the processing burden of the second device, and increase the attack difficulty of the attacker.

In this embodiment of this application, the on-demand encryption mode of the communication packet is defined, so that the data that does not need to be encrypted can be transmitted in plaintext in the on-demand encryption mode. This reduces the data volume of the encryption payload, improves the encryption rate, and improves communication efficiency.

In addition, in the on-demand encryption mode, the stream encryption key generation seed of the ciphertext data can be stored in the plaintext data, so that the UDP protocol can support the stream encryption algorithm. This further improves communication efficiency.

Figure 10:
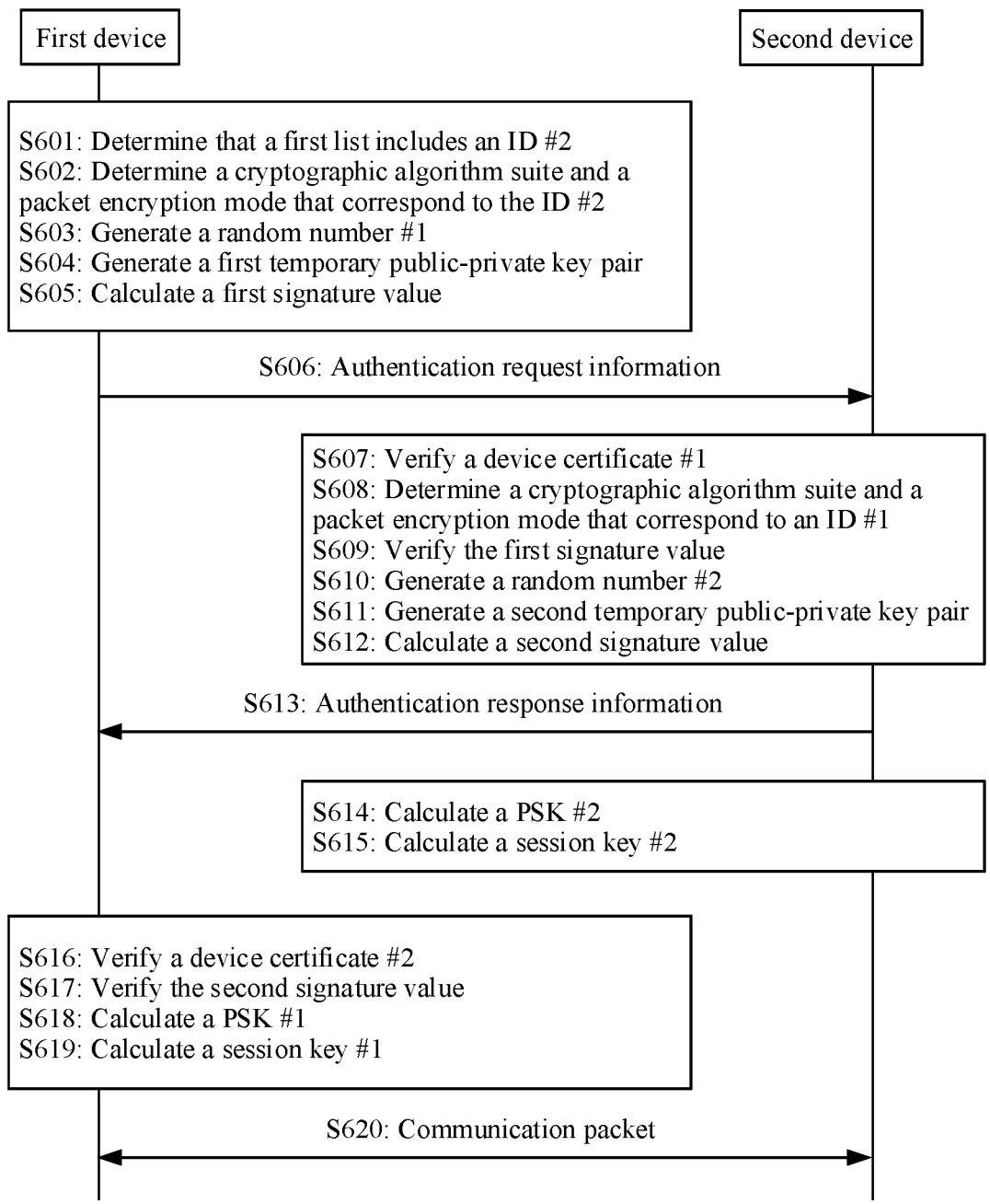
FIG. 10 to FIG. 12 each are a schematic flowchart of a communication method according to an embodiment of this application.

FIG. 10 is a schematic flowchart of a method 600 according to another embodiment of this application. As shown in FIG. 10, the method 600 may include S601 to S620. The following describes the steps in detail.

S601: A first device determines that a pre-configured first list includes identifier information (an ID #2) of a second device.

The first list includes identifier information of a device that needs to be authenticated by the first device.

If the first device determines that the first list includes the ID #2, the first device continues to perform the authentication process; or if the first device determines that the first list does not include the ID #2, the first device does not perform the authentication process with the second device.

S602: The first device determines a cryptographic algorithm suite and a packet encryption mode that correspond to the ID #2.

The first device may determine, based on a third mapping relationship, the cryptographic algorithm suite corresponding to the ID #2. The first device may determine, based on a fourth mapping relationship, the packet encryption mode corresponding to the ID #2.

S603: The first device generates a random number #1.

S604: The first device generates a first temporary public-private key pair based on a key agreement algorithm in the cryptographic algorithm suite.

The first temporary public-private key pair includes a tempPK #1 and a tempSK #1.

S605: The first device generates a first signature value based on a digital signature algorithm in the cryptographic algorithm suite.

The first device constructs a msg #1, and content in the msg #1 is {ID #1||random #1||tempPK #1}. Further, the first device encrypts the msg #1 by using the SK #1 as a key and based on the digital signature algorithm specified in the cryptographic algorithm suite to obtain a Sign #1. Sign #1=Sign(ID #1||random #1||tempPK #1), where "||" indicates a connection, and Sign( ) indicates that calculation is performed based on the digital signature algorithm.

S606: The first device sends authentication request information to the second device.

The authentication request information includes a device certificate #1, the random #1, the tempPK #1, and the Sign #1. The device certificate #1 includes an ID #1, a PK #1, and a root signature.

S607: The second device verifies validity of the device certificate #1.

The second device determines, based on the ID #1 in the device certificate #1, that the ID #1 is stored in a pre-configured second list. If the second list stores the ID #1, the second device determines that the first device is a device that needs to be authenticated; or if the second list does not store the ID #1, the second device determines that the first device is a device that does not need to be authenticated, and further terminates the authentication process.

When the second device determines that the first device is the device that needs to be authenticated, the second device continues to verify the root signature in the device certificate #1 by using a PK #2. If verification succeeds, the verification process continues to be performed; or if verification fails, the verification process is terminated.

S608: The second device determines a cryptographic algorithm suite and a packet encryption mode that correspond to the ID #1.

The second device may determine, based on a first mapping relationship, the cryptographic algorithm suite corresponding to the ID #1. The first device may determine, based on a second mapping relationship, the packet encryption mode corresponding to the ID #1.

S609: The second device verifies the first signature value.

The second device may construct a msg #1 based on the ID #1 included in the device certificate #1 and the random #1 and the tempPK #1 included in the authentication request information. Further, the second device verifies validity of the Sign #1 by using the PK #1 included in the device certificate #1. After verification succeeds, the second device performs a subsequent authentication process. If verification fails, verification fails.

S610: The second device generates a random number #2.

S611: The second device generates a second temporary public-private key pair based on a key agreement algorithm in the cryptographic algorithm suite.

The second temporary public-private key pair includes a tempPK #2 and a tempSK #2.

S612: The second device calculates a second signature value based on a digital signature algorithm in the cryptographic algorithm suite.

The second device constructs a msg #2, and content in the msg #2 is {ID #2||random #2||tempPK #2}. Further, the first device encrypts the msg #2 by using an SK #2 as a key and based on the digital signature algorithm specified in the cryptographic algorithm suite to obtain a Sign #2. Sign #2=Sign(ID #2||random #2||tempPK #2), where "||" indicates a connection, and Sign( ) indicates that calculation is performed based on the digital signature algorithm.

S613: The second device sends authentication response information to the first device.

The authentication response information includes a device certificate #2, the random #2, the tempPK #2, and the Sign #2. The device certificate #2 includes an ID #2, a PK #2, and a root signature.

S614: The second device calculates a PSK #2.

PSK #2=KDF(ID #1, ID #2, tempSK #2, tempPK #1), where KDF( ) indicates that calculation is performed based on a key derivation function.

S615: The second device calculates a session key #2.

SessionKey #2=KDF(PSK #2, random #1, random #2), where KDF( ) indicates that calculation is performed based on a key derivation function.

S616: The first device verifies validity of the device certificate #2.

The first device determines, based on the ID #2 in the device certificate #2, that the ID #2 is stored in the pre-configured first list. If the first list stores the ID #2, the first device determines that the second device is a device that needs to be authenticated; or if the first list does not store the ID #2, the first device determines that the second device is a device that does not need to be authenticated, and further terminates the authentication process.

When the first device determines that the second device is the device that needs to be authenticated, the first device continues to verify the root signature in the device certificate #2 by using the PK #1. If verification succeeds, the verification process continues to be performed; or if verification fails, the verification process is terminated.

S617: The first device verifies the second signature value.

The first device may construct a msg #2 based on the ID #2 included in the device certificate #2 and the random #2 and the tempPK #2 included in the authentication response information. Further, the first device verifies validity of the Sign #2 by using the PK #2 included in the device certificate #2. After verification succeeds, the first device performs a subsequent authentication process. If verification fails, verification fails.

S618: The first device calculates a PSK #1.

PSK #1=KDF(ID #1, ID #2, tempPK #2, tempSK #1), where KDF( ) indicates that calculation is performed based on a key derivation function.

It may be understood that although the PSK #1 and the PSK #2 are respectively used to represent PSKs generated by the first device and the second device in this embodiment of this application, this is merely for differentiation, and the PSK #1 and the PSK #2 should be considered equivalent.

S619: The first device calculates a session key #1.

SessionKey #1=KDF(PSK #1, random #1, random #2), where KDF( ) indicates that calculation is performed based on a key derivation function.

It may be understood that although in this embodiment of this application, the SessionKey #1 and the SessionKey #2 are respectively used to represent SessionKeys generated by the first device and the second device, this is merely for differentiation, and the SessionKey #1 and the SessionKey #2 should be considered equivalent.

S620: The first device transmits a communication packet with the second device based on the determined cryptographic algorithm suite and packet encryption mode.

In this embodiment of this application, the list pre-configured in the first device records a list of valid device identifiers of handshake sources, so that a malicious device can be prevented from forging a false source to initiate a denial-of-service attack, and plays a role of a cookie field in the conventional technology. In other words, an original process of allocating the cookie fields in the TLS protocol and the DTLS protocol can be omitted, thereby reducing one interaction process in a handshake process. The second device can directly ignore a handshake request from an invalid device based on the pre-configured second list, so that the second device performs only a valid handshake. This can reduce a processing burden of the second device, and increase an attack difficulty of an attacker.

In this embodiment of this application, the cryptographic algorithm suite corresponds to the identifier information of the device, so that the first device and the second device can determine, based on the stored mapping relationship, the cryptographic algorithm suite used in a communication process, thereby omitting a negotiation process of the cryptographic algorithm suite in the original TLS protocol and DTLS protocol. Therefore, there is no need to transfer a list of supported cryptographic algorithm suites in the handshake process between the first device and the second device. This reduces a volume of data transmitted in the handshake process, and improves transmission reliability and communication efficiency.

In addition, the temporary public-private key pair is used in a session key negotiation process, and this can meet a forward security requirement.

Figure 11:
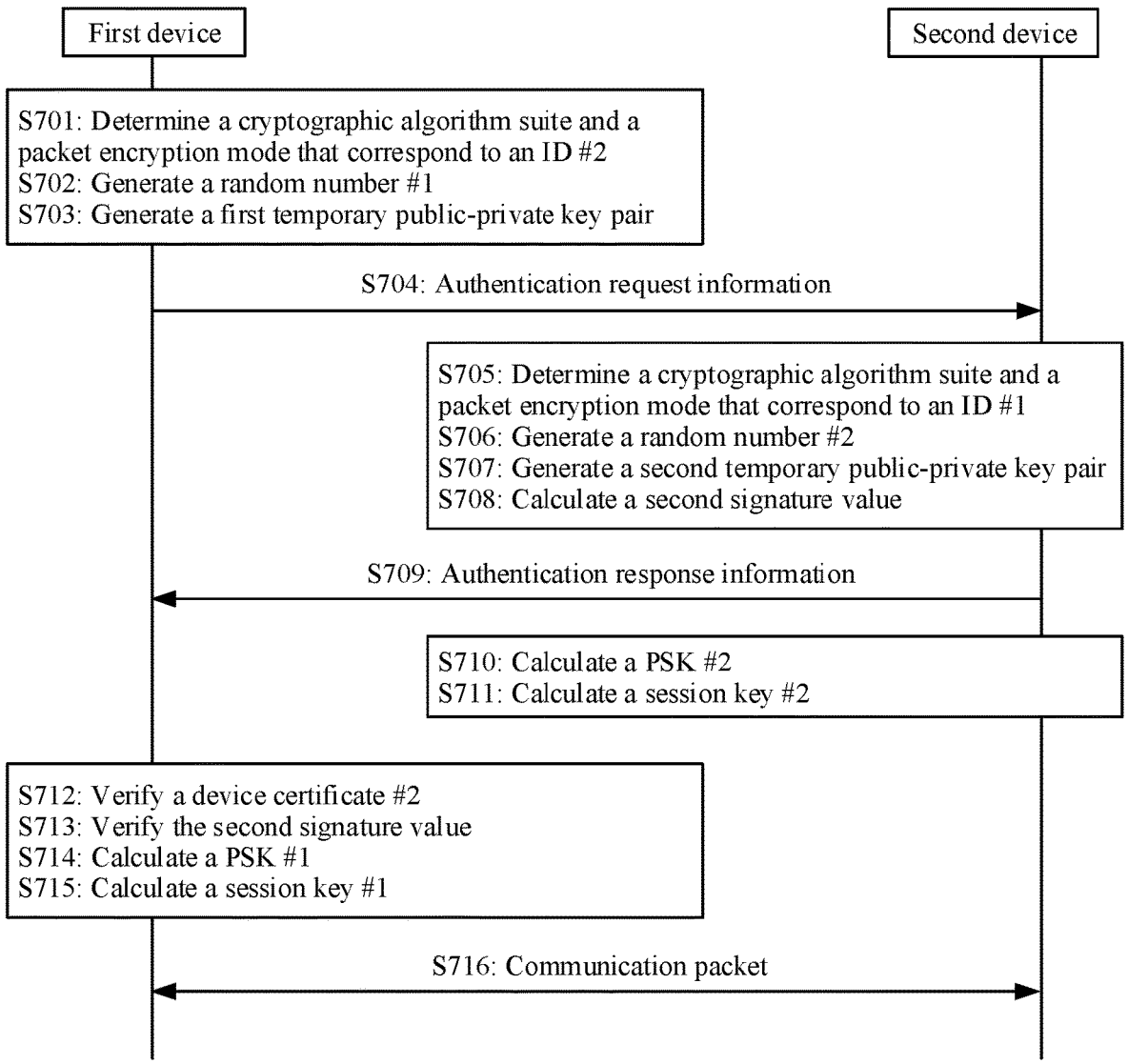

FIG. 11 is a schematic flowchart of a method 700 according to another embodiment of this application. As shown in FIG. 11, the method 700 may include S701 to S716. S702 and S703 are the same as S603 and S604 in the method 600, and S706 to S716 are the same as S610 to S620 in the method 600. For brevity, details are not described in this embodiment of this application again. The following describes the remaining steps in detail.

S701: A first device determines a cryptographic algorithm suite and a packet encryption mode that correspond to an ID #2.

The first device may determine, based on a third mapping relationship, the cryptographic algorithm suite corresponding to the ID #2. The first device may determine, based on a fourth mapping relationship, the packet encryption mode corresponding to the ID #2.

In this embodiment of this application, the first device may determine, based on the third mapping relationship, the cryptographic algorithm suite corresponding to the ID #2, and the first device may consider by default that a second device is a device that needs to be authenticated.

S704: The first device sends authentication response information to the second device.

The authentication response information includes an ID #1, a random #1, and a tempPK #1.

S705: The second device determines a cryptographic algorithm suite and a packet encryption mode that correspond to the ID #1.

The second device may determine, based on a first mapping relationship, the cryptographic algorithm suite corresponding to the ID #1. The first device may determine, based on a second mapping relationship, the packet encryption mode corresponding to the ID #1.

Similarly, in this embodiment of this application, the second device may determine, based on the first mapping relationship, the cryptographic algorithm suite corresponding to the ID #1, and the second device may consider by default that the first device is a device that needs to be authenticated.

This embodiment of this application performs only one-way identity validity authentication performed by the first device on the second device. This further reduces operation steps and a volume of data exchanged in a handshake process. Although the second device does not authenticate validity of an identity of the first device, in a process of determining the cryptographic algorithm suite based on the first mapping relationship, the second device can determine whether the first device is the device that needs to be authenticated. This increases difficulty in sending a malicious handshake request by an attacker, and improves security compared with a current one-way authentication handshake process.

In this embodiment of this application, the cryptographic algorithm suite corresponds to the identifier information of the device, so that the first device and the second device can determine, based on the stored mapping relationship, the cryptographic algorithm suite used in a communication process, thereby omitting a negotiation process of the cryptographic algorithm suite in the original TLS protocol and DTLS protocol. There is no need to transfer a list of supported cryptographic algorithm suites in the handshake process between the first device and the second device. This reduces a volume of data transmitted in the handshake process, and improves transmission reliability and communication efficiency.

In addition, a temporary public-private key pair is used in a session key negotiation process, and this can meet a forward security requirement.

Figure 12:
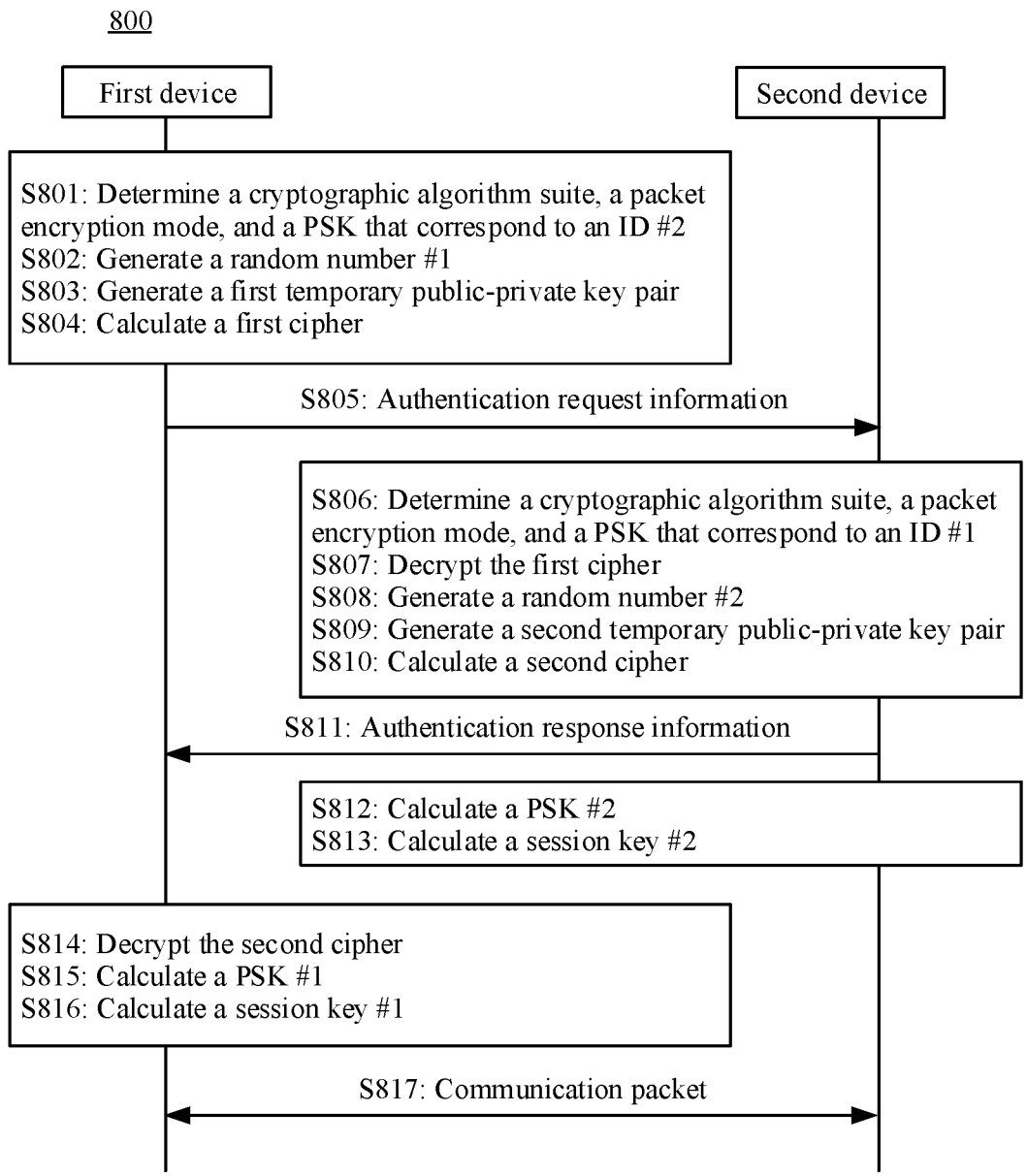

FIG. 12 is a schematic flowchart of a method 800 according to another embodiment of this application. As shown in FIG. 12, the method 800 may include S801 to S817. S802 and S803 are the same as S603 and S604 in the method 600, S808 and S809 are the same as S610 and S611 in the method 600, S812 and S813 are the same as S614 and S615 in the method 600, and S815 to S817 are the same as S618 to S620 in the method 600. For brevity, details are not described in this embodiment of this application. The following describes the remaining steps in detail.

S801: A first device determines a cryptographic algorithm suite, a packet encryption mode, and a PSK that correspond to an ID #2.

The first device may determine, based on a third mapping relationship, the cryptographic algorithm suite corresponding to the ID #2. The first device may determine, based on a fourth mapping relationship, the packet encryption mode corresponding to the ID #2. The first device may determine, based on a pre-configured first PSK list, the PSK corresponding to the ID #2.

S804: The first device calculates a first cipher.

The first device constructs a msg #1, and content in the msg #1 is {ID #1∥random #1}. Further, the first device encrypts the msg #1 by using the PSK as a key and based on a symmetric encryption algorithm in the cryptographic algorithm suite to generate a cipher #1. Cipher #1=$\text{Enc}_{PSK}$ (ID #1∥random #1), where "∥" indicates a connection, and $\text{Enc}_{PSK}()$ indicates that encryption is performed by using the PSK as the key and based on the symmetric encryption algorithm.

S805: The first device sends authentication response information to a second device.

The authentication response information includes an ID #1, a cipher #1, and a tempPK #1.

S806: The second device determines a cryptographic algorithm suite, a packet encryption mode, and a PSK that correspond to the ID #1.

The second device may determine, based on a first mapping relationship, the cryptographic algorithm suite corresponding to the ID #1. The second device may determine, based on a second mapping relationship, the packet encryption mode corresponding to the ID #1. The second device may determine, based on a pre-configured second PSK list, the PSK corresponding to the ID #1.

S807: The second device decrypts the first cipher.

After determining the cryptographic algorithm suite, the second device decrypts the cipher #1 by using the determined PSK as a key and based on a symmetric encryption algorithm in the cryptographic algorithm suite to obtain the ID #1. Further, the second device determines whether an ID #1 obtained by decrypting the cipher #1 is consistent with the ID #1 in the authentication request information. If the ID #1 is inconsistent with the ID #1, authentication fails. If the ID #1 is consistent with the ID #1, a subsequent authentication process continues.

S810: The second device calculates a second cipher.

The second device constructs a msg #2, and content in the msg #2 is {ID #2∥random #2}. Further, the second device encrypts the msg #2 by using the PSK as a key and based on the symmetric encryption algorithm in the cryptographic algorithm suite to generate a cipher #2. Cipher #2=$\text{Enc}_{PSK}$ (ID #2∥random #2), where "∥" indicates a connection, and $\text{Enc}_{PSK}()$ indicates that encryption is performed by using the PSK as the key and based on the symmetric encryption algorithm.

S811: The second device sends authentication response information to the first device.

The authentication response information includes the ID #2, the tempPK #2, and the cipher #2.

S814: The first device decrypts the second cipher.

The first device decrypts the cipher #2 by using the determined PSK as a key and based on the symmetric encryption algorithm in the cryptographic algorithm suite to obtain an ID #2. Further, the second device determines whether the ID #2 obtained by decrypting the cipher #2 is consistent with the ID #2 in the authentication response information. If the ID #2 is inconsistent with the ID #2, authentication fails. If the ID #2 is consistent with the ID #2, a subsequent authentication process continues.

In this embodiment of this application, the cryptographic algorithm suite corresponds to the identifier information of the device, so that the first device and the second device can determine, based on the stored mapping relationship, the cryptographic algorithm suite used in a communication process, thereby omitting a negotiation process of the cryptographic algorithm suite in the original TLS protocol and DTLS protocol. There is no need to transfer a list of supported cryptographic algorithm suites in the handshake process between the first device and the second device. This reduces a volume of data transmitted in the handshake process, and improves transmission reliability and communication efficiency.

After the cryptographic algorithm suite is determined, the cipher can be generated by using the pre-stored PSK to replace a device certificate. A length of the cipher is much shorter than a length of the device certificate. This greatly reduces a volume of data exchanged in the handshake interaction process, and improves handshake efficiency and reliability.

In addition, after the cipher is used to replace the device certificate, the device does not need to perform signature verification on a root signature in the device certificate. Instead, the device performs a symmetric encryption and decryption operation on the cipher. A speed of the symmetric encryption and decryption operation is much higher than a speed of signature verification, and this can improve handshake efficiency.

In addition, a temporary public-private key pair is used in a session key negotiation process, and this can meet a forward security requirement.

The communication method provided in embodiments of this application is described above in detail with reference to FIG. 5 to FIG. 12. An apparatus provided in embodiments of this application is described in detail below with reference to FIG. 13 and FIG. 14.

Figure 13:
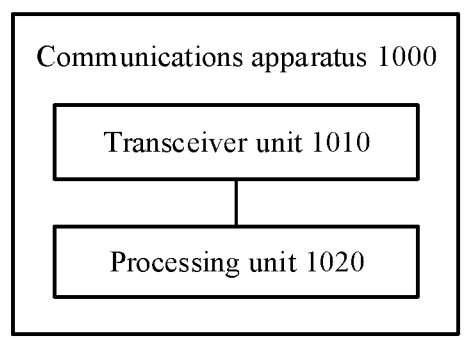
FIG. 13 and FIG. 14 each are a schematic block diagram of a communications apparatus according to an embodiment of this application.

FIG. 13 is a schematic block diagram of a communications apparatus 1000 according to an embodiment of this application. As shown in the figure, the communications apparatus 1000 may include a transceiver unit 1010 and a processing unit 1020.

In a possible design, the communications apparatus 1000 may correspond to the first device in the foregoing method embodiments.

It should be understood that the communications apparatus 1000 may include units configured to perform the methods performed by the first device in the method 500 in FIG. 5 to FIG. 7, the method 600 in FIG. 10, the method 700 in FIG. 11, and the method 800 in FIG. 12. In addition, the units in the communications apparatus 1000 and the foregoing other operations and/or functions are separately used to implement corresponding procedures performed by the first device in the method 500 in FIG. 5 to FIG. 7, the method 600 in FIG. 10, the method 700 in FIG. 11, and the method 800 in FIG. 12. It should be understood that specific processes in which the units perform the foregoing corresponding steps are described in detail in the foregoing method embodiments. For brevity, details are not described herein again.

In another possible design, the communications apparatus 1000 may correspond to the second device in the foregoing method embodiments.

It should be understood that the communications apparatus 1000 may include units configured to perform the methods performed by the second device in the method 500 in FIG. 5 to FIG. 7, the method 600 in FIG. 10, the method 700 in FIG. 11, and the method 800 in FIG. 12. In addition, the units in the communications apparatus 1000 and the foregoing other operations and/or functions are separately used to implement corresponding procedures performed by the second device in the method 500 in FIG. 5 to FIG. 7, the method 600 in FIG. 10, the method 700 in FIG. 11, and the method 800 in FIG. 12. It should be understood that specific processes in which the units perform the foregoing corresponding steps are described in detail in the foregoing method embodiments. For brevity, details are not described herein again.

Figure 14:
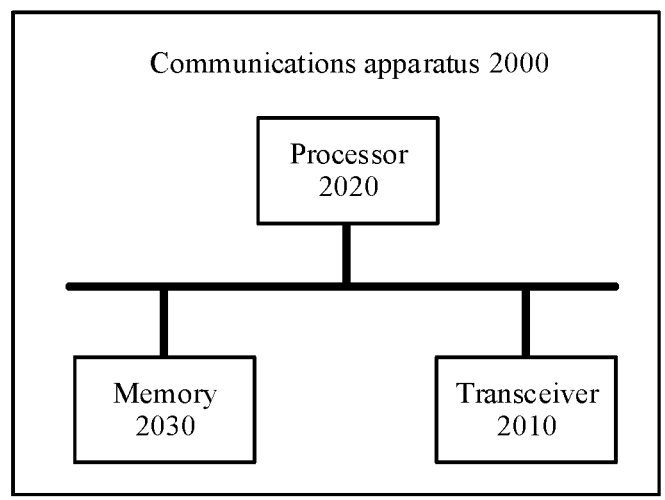

It should be understood that the transceiver unit 1010 in the communications apparatus 1000 may correspond to a transceiver 2010 in a communications apparatus 2000 shown in FIG. 14, and the processing unit 1020 in the communications apparatus 1000 may correspond to a processor 2020 in the communications apparatus 2000 shown in FIG. 14.

FIG. 14 is a schematic block diagram of the communications apparatus 2000 according to an embodiment of this application. As shown in the figure, the communications apparatus 2000 may include the processor 2020, and may further include the transceiver 2010 and a memory 2030. The processor 2020 is coupled to the memory 2030, and is configured to execute instructions stored in the memory, to control the transceiver 2010 to send a signal and/or receive a signal.

It should be understood that the processor 2020 and the memory 2030 may be integrated into one processing apparatus. The processor 2020 is configured to execute program code stored in the memory 2030 to implement the foregoing functions. During specific implementation, the memory 2030 may alternatively be integrated into the processor 2020, or may be independent of the processor 2020.

In a possible design, the communications apparatus 2000 may correspond to the first device in the foregoing method embodiments.

Specifically, the communications apparatus 2000 may include units configured to perform the methods performed by the first device in the method 500 in FIG. 5 to FIG. 7, the method 600 in FIG. 10, the method 700 in FIG. 11, and the method 800 in FIG. 12. In addition, the units in the communications apparatus 2000 and the foregoing other operations and/or functions are separately used to implement corresponding procedures performed by the first device in the method 500 in FIG. 5 to FIG. 7, the method 600 in FIG. 10, the method 700 in FIG. 11, and the method 800 in FIG. 12. It should be understood that specific processes in which the units perform the foregoing corresponding steps are described in detail in the foregoing method embodiments. For brevity, details are not described herein again.

In another possible design, the communications apparatus 2000 may correspond to the second device in the foregoing method embodiments.

Specifically, the communications apparatus 2000 may include units configured to perform the methods performed by the second device in the method 500 in FIG. 5 to FIG. 7, the method 600 in FIG. 10, the method 700 in FIG. 11, and the method 800 in FIG. 12. In addition, the units in the communications apparatus 2000 and the foregoing other operations and/or functions are separately used to implement corresponding procedures performed by the second device in the method 500 in FIG. 5 to FIG. 7, the method 600 in FIG. 10, the method 700 in FIG. 11, and the method 800 in FIG. 12. It should be understood that specific processes in which the units perform the foregoing corresponding steps are described in detail in the foregoing method embodiments. For brevity, details are not described herein again.

According to the method provided in embodiments of this application, this application further provides a computer program product. The computer program product includes computer program code. When the computer program code is run on a computer, the computer is enabled to perform the method in any one of embodiments shown in FIG. 5 to FIG. 7 and FIG. 10 to FIG. 12.

According to the method provided in embodiments of this application, this application further provides a computer-readable storage medium. The computer-readable storage medium stores program code. When the program code is run on a computer, the computer is enabled to perform the method in any one of embodiments shown in FIG. 5 to FIG. 7 and FIG. 10 to FIG. 12.

According to the method provided in embodiments of this application, this application further provides a system. The system includes the foregoing first device and second device.

All or some of foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, all or some of the procedures or functions in embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (solid state disk, SSD)), or the like.

Network elements in the foregoing apparatus embodiments may totally correspond to network elements in the method embodiments. A corresponding unit performs a corresponding step. For example, a transceiver unit (transceiver) performs a receiving step or a sending step in the method embodiments, and a processing unit (processor) may perform another step other than the sending step and the receiving step. For a function of a specific unit, refer to a corresponding method embodiment. There may be one or more processors.

It should be understood that "one embodiment" or "an embodiment" mentioned in the entire specification does not mean that particular features, structures, or characteristics related to embodiment are included in at least one embodiment of this application. Therefore, "in one embodiment" or "in an embodiment" appearing in the specification does not refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

The terms such as "unit", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may perform communication by using a local and/or remote process and according to, for example, a signal having one or more data packets (for example, data from two components interacting with another component in a local system, a distributed system, and/or across a network such as the internet interacting with other systems by using the signal).

A person of ordinary skill in the art may be aware that, in combination with the examples described in embodiments disclosed in this specification, units and steps of methods may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The foregoing units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments.

In addition, each functional unit in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus, comprising at least one processor and at least one memory, wherein the at least one memory is configured to store program instructions, and the at least one processor is coupled to the at least one memory to execute the instructions to:
   receive, authentication request information from a first device, wherein the authentication request information comprises identifier information of the first device;
   determine, based on a mapping relationship, a cryptographic algorithm suite corresponding to the identifier information of the first device, wherein the mapping relationship is pre-stored in the communication apparatus and indicates a correspondence among identifier information of at least one device, at least one packet encryption mode, at least one pre-shared key (PSK), and at least one cryptographic algorithm suite, wherein the identifier information of the at least one device includes the identifier information of the first device, and each of the at least one packet encryption mode, the at least one PSK, and the at least one cryptographic algorithm suite is on a one-to-one correspondence with the identifier information of the first device;
   generate, authentication response information based on the at least one cryptographic algorithm suite; and
   send, the authentication response information to the first device.

2. The apparatus according to claim 1, wherein the at least one processor further executes the instructions to:
   determine, that a pre-configured second list comprises the identifier information of the first device, wherein the pre-configured second list comprises identifier information of a device that needs to be authenticated.

3. The apparatus according to claim 1, wherein the authentication response information further comprises a second device certificate of a second device or a second signature value used by the second device.

4. The apparatus according to claim 1, wherein the authentication response information further comprises a second random number used by a second device or a second temporary public key used by the second device.

5. The apparatus according to claim 1, wherein the authentication response information further comprises a second cipher, which is generated by a second device based on a pre-stored pre-shared key and the at least one cryptographic algorithm suite.

6. The apparatus according to claim 5, wherein the authentication response information further comprises a second temporary public key used by the second device and identifier information of the second device.

7. The apparatus according to claim 1, wherein each of the at least one cryptographic algorithm suite meets a forward security requirement.

8. The apparatus according to claim 1, wherein the at least one processor further executes the instructions to:
   determine, a packet encryption mode used for communication with the first device, wherein the packet encryption mode comprises one of a full encryption mode and an on-demand encryption mode.

9. The apparatus according to claim 8, wherein the at least one processor further executes the instructions to:
   determine, based on the mapping relationship, the packet encryption mode corresponding to the identifier information of the first device.

10. The apparatus according to claim 8, wherein the packet encryption mode is the on-demand encryption mode, and the at least one processor further executes the instructions to:
    generate, a communication packet, which comprises the following fields: a plaintext identifier, plaintext data, a ciphertext identifier, and ciphertext data.

11. A communication apparatus, comprising: at least one processor and at least one memory, wherein the at least one memory is configured to store program instructions, and the at least one processor is coupled to the at least one memory to execute the instructions to:
    determine, based on a mapping relationship, a cryptographic algorithm suite corresponding to identifier information of a second device, wherein the mapping relationship is pre-stored in the communication apparatus and indicates a correspondence among identifier information of at least one device, at least one packet encryption mode, at least one pre-shared key (PSK), and at least one cryptographic algorithm suite, wherein the identifier information of the at least one device includes the identifier information of the second device, and each of the at least one packet encryption mode, the at least one PSK, and the at least one cryptographic algorithm suite is on a one-to-one correspondence with the identifier information of the second device;
    generate, authentication request information based on the at least one cryptographic algorithm suite, wherein the authentication request information comprises identifier information of a first device; and send, the authentication request information to the second device; and receive, authentication response information from the second device.

12. The apparatus according to claim 11, wherein the at least one processor further executes the instructions to:

determine, that a pre-configured first list comprises the identifier information of the second device, wherein the pre-configured first list comprises identifier information of a device that needs to be authenticated.

13. The apparatus according to claim 11, wherein the authentication request information further comprises a first device certificate of the first device and/or a first signature value used by the first device.

14. The apparatus according to claim 11, wherein the authentication request information further comprises a first cipher, which is generated by the first device based on a pre-stored pre-shared key and the at least one cryptographic algorithm suite.

15. The apparatus according to claim 11, wherein the authentication request information further comprises a first random number used by the first device or a first temporary public key used by the first device.

16. The apparatus according to claim 11, wherein each of the at least one cryptographic algorithm suite meets a forward security requirement.

17. The apparatus according to claim 11, wherein the at least one processor further executes the instructions to:

determine, a packet encryption mode used for communication with the second device, wherein the packet encryption mode comprises one of a full encryption mode and an on-demand encryption mode.

18. The apparatus according to claim 17, wherein the at least one processor further executes the instructions to:

determine, based on the mapping relationship, the packet encryption mode corresponding to the identifier information of the second device.

19. The apparatus according to claim 17, wherein the packet encryption mode is the on-demand encryption mode, and the at least one processor further executes the instructions to:

generate, a communication packet, which comprises the following fields: a plaintext identifier, plaintext data, a ciphertext identifier, and ciphertext data.

20. The apparatus according to claim 19, wherein the plaintext data comprises a stream encryption key generation seed of the ciphertext data.

* * * * *